(12) United States Patent
Yamazaki et al.

(10) Patent No.: US 10,013,087 B2
(45) Date of Patent: Jul. 3, 2018

(54) SEMICONDUCTOR DISPLAY DEVICE AND DRIVING METHOD THE SAME

(71) Applicant: Semiconductor Energy Laboratory Co., Ltd., Atsugi-shi, Kanagawa-ken (JP)

(72) Inventors: Shunpei Yamazaki, Tokyo (JP); Jun Koyama, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 0 days.

(21) Appl. No.: 14/974,246

(22) Filed: Dec. 18, 2015

(65) Prior Publication Data
US 2016/0117033 A1 Apr. 28, 2016

Related U.S. Application Data

(63) Continuation of application No. 13/094,397, filed on Apr. 26, 2011, now Pat. No. 9,218,081.

(30) Foreign Application Priority Data

Apr. 28, 2010 (JP) .................................. 2010-102891

(51) Int. Cl.
*G06F 3/041* (2006.01)
*G06F 1/32* (2006.01)
(Continued)

(52) U.S. Cl.
CPC ........ *G06F 3/0412* (2013.01); *G02F 1/13338* (2013.01); *G06F 1/3265* (2013.01);
(Continued)

(58) Field of Classification Search
CPC ........ G06F 3/0412; G06F 3/044; G06F 3/045; G06F 3/3648; G09G 3/3677;
(Continued)

(56) References Cited

U.S. PATENT DOCUMENTS 5,731,856 A 3/1998 Kim et al.
5,744,864 A 4/1998 Cillessen et al.
(Continued)

FOREIGN PATENT DOCUMENTS

CN 001945387 A 4/2007
CN 101211552 A 7/2008
(Continued)

OTHER PUBLICATIONS

Written Opinion (Application No. PCT/JP2011/058748) dated May 10, 2011.
(Continued)

*Primary Examiner* — Sahlu Okebato
(74) *Attorney, Agent, or Firm* — Fish & Richardson P.C.

(57) ABSTRACT

It is an object to provide a semiconductor display device having a touch panel, which can reduce power consumption. The semiconductor display device includes a panel which is provided with a pixel portion and a driver circuit which controls an input of the image signal to the pixel portion, and a touch panel provided in a position overlapping with the panel in the pixel portion. The pixel portion includes a display element configured to perform display in accordance with voltage of the image signal to be input, and a transistor configured to control retention of the voltage. The transistor includes an oxide semiconductor in a channel formation region. The driving frequency of the driver circuit, that is, the number of writing operations of the image signal for a certain period is changed in accordance with an operation signal from a touch panel.

15 Claims, 17 Drawing Sheets

(51) Int. Cl.
*G06F 3/044* (2006.01)
*G06F 3/045* (2006.01)
*G09G 3/36* (2006.01)
*G02F 1/1333* (2006.01)

(52) U.S. Cl.
CPC .............. *G06F 3/044* (2013.01); *G06F 3/045* (2013.01); *G09G 3/3648* (2013.01); *G09G 3/3677* (2013.01); *G09G 3/3688* (2013.01); *G09G 2300/0426* (2013.01); *G09G 2310/0286* (2013.01); *G09G 2310/08* (2013.01); *G09G 2330/021* (2013.01); *G09G 2360/14* (2013.01); *Y02B 60/1242* (2013.01)

(58) Field of Classification Search
CPC .............. G09G 3/3648; G09G 3/3688; G09G 2300/0426; G09G 2310/0286; G09G 2310/08; G09G 2330/021; G09G 2360/14; Y02B 60/1242
See application file for complete search history.

(56) References Cited

U.S. PATENT DOCUMENTS

| | | | |
|---|---|---|---|
| 5,767,832 | A | 6/1998 | Koyama et al. |
| 5,844,535 | A * | 12/1998 | Itoh ..................... G09G 3/3659 345/103 |
| 5,977,940 | A | 11/1999 | Akiyama et al. |
| 6,169,532 | B1 | 1/2001 | Sumi et al. |
| 6,239,788 | B1 * | 5/2001 | Nohno ................. G06F 3/0412 345/173 |
| 6,294,274 | B1 | 9/2001 | Kawazoe et al. |
| 6,310,600 | B1 | 10/2001 | Koyama et al. |
| 6,563,174 | B2 | 5/2003 | Kawasaki et al. |
| 6,614,418 | B2 | 9/2003 | Koyama et al. |
| 6,727,522 | B1 | 4/2004 | Kawasaki et al. |
| 6,747,638 | B2 | 6/2004 | Yamazaki et al. |
| 6,909,413 | B2 | 6/2005 | Nanno et al. |
| 7,049,190 | B2 | 5/2006 | Takeda et al. |
| 7,061,014 | B2 | 6/2006 | Hosono et al. |
| 7,064,346 | B2 | 6/2006 | Kawasaki et al. |
| 7,084,848 | B2 | 8/2006 | Senda et al. |
| 7,084,849 | B2 | 8/2006 | Noguchi et al. |
| 7,105,868 | B2 | 9/2006 | Nause et al. |
| 7,123,246 | B2 | 10/2006 | Nakatani et al. |
| 7,211,825 | B2 | 5/2007 | Shih et al. |
| 7,282,782 | B2 | 10/2007 | Hoffman et al. |
| 7,286,108 | B2 | 10/2007 | Tsuda et al. |
| 7,297,977 | B2 | 11/2007 | Hoffman et al. |
| 7,321,353 | B2 | 1/2008 | Tsuda et al. |
| 7,323,356 | B2 | 1/2008 | Hosono et al. |
| 7,385,224 | B2 | 6/2008 | Ishii et al. |
| 7,402,506 | B2 | 7/2008 | Levy et al. |
| 7,411,209 | B2 | 8/2008 | Endo et al. |
| 7,430,025 | B2 | 9/2008 | Okamoto et al. |
| 7,453,065 | B2 | 11/2008 | Saito et al. |
| 7,453,087 | B2 | 11/2008 | Iwasaki |
| 7,462,862 | B2 | 12/2008 | Hoffman et al. |
| 7,468,304 | B2 | 12/2008 | Kaji et al. |
| 7,501,293 | B2 | 3/2009 | Ito et al. |
| 7,511,343 | B2 | 3/2009 | Li et al. |
| 7,601,984 | B2 | 10/2009 | Sano et al. |
| 7,645,478 | B2 | 1/2010 | Thelss et al. |
| 7,674,650 | B2 | 3/2010 | Akimoto et al. |
| 7,732,819 | B2 | 6/2010 | Akimoto et al. |
| 7,737,957 | B2 | 6/2010 | Lee et al. |
| 7,773,069 | B2 | 8/2010 | Miyasaka et al. |
| 7,791,072 | B2 | 9/2010 | Kumomi et al. |
| 7,791,074 | B2 | 9/2010 | Iwasaki |
| 7,829,444 | B2 | 11/2010 | Yabuta et al. |
| 7,843,533 | B2 | 11/2010 | Noguchi et al. |
| 7,893,495 | B2 | 2/2011 | Li et al. |
| 7,924,276 | B2 | 4/2011 | Tsuda et al. |
| 7,935,582 | B2 | 5/2011 | Iwasaki |
| 7,956,361 | B2 | 6/2011 | Iwasaki |
| 8,105,126 | B2 | 1/2012 | Jiang et al. |
| 8,129,717 | B2 | 3/2012 | Yamazaki et al. |
| 8,154,024 | B2 | 4/2012 | Iwasaki |
| 8,164,256 | B2 | 4/2012 | Sano et al. |
| 8,184,224 | B2 | 5/2012 | Asano et al. |
| 8,199,123 | B2 | 6/2012 | Jiang et al. |
| 8,202,365 | B2 | 6/2012 | Umeda et al. |
| 8,216,879 | B2 | 7/2012 | Kaji et al. |
| 8,228,308 | B2 | 7/2012 | Jiang et al. |
| 8,228,310 | B2 | 7/2012 | Lee et al. |
| 8,237,677 | B2 | 8/2012 | Jiang et al. |
| 8,237,679 | B2 | 8/2012 | Jiang et al. |
| 8,237,680 | B2 | 8/2012 | Jiang et al. |
| 8,278,136 | B2 | 10/2012 | Tanaka et al. |
| 8,293,595 | B2 | 10/2012 | Yamazaki et al. |
| 8,400,577 | B2 | 3/2013 | Asano et al. |
| 8,451,234 | B2 | 5/2013 | Sato et al. |
| 8,541,944 | B2 | 9/2013 | Sano et al. |
| 8,575,614 | B2 | 11/2013 | Makita |
| 8,624,237 | B2 | 1/2014 | Yamazaki et al. |
| 8,642,402 | B2 | 2/2014 | Yano et al. |
| 8,729,544 | B2 | 5/2014 | Yamazaki et al. |
| 8,785,240 | B2 | 7/2014 | Watanabe |
| 8,841,710 | B2 | 9/2014 | Yamazaki et al. |
| 9,046,968 | B2 | 6/2015 | Noguchi et al. |
| 9,087,745 | B2 | 7/2015 | Yamazaki et al. |
| 9,111,804 | B2 | 8/2015 | Yamazaki et al. |
| 9,412,798 | B2 | 8/2016 | Yamazaki et al. |
| 9,496,406 | B2 | 11/2016 | Yamazaki et al. |
| 9,606,667 | B2 | 3/2017 | Noguchi et al. |
| 9,666,719 | B2 | 5/2017 | Yamazaki et al. |
| 2001/0046027 | A1 | 11/2001 | Tai et al. |
| 2002/0011972 | A1 | 1/2002 | Yamazaki et al. |
| 2002/0056838 | A1 | 5/2002 | Ogawa |
| 2002/0132454 | A1 | 9/2002 | Ohtsu et al. |
| 2003/0020701 | A1 | 1/2003 | Nakamura et al. |
| 2003/0189401 | A1 | 10/2003 | Kido et al. |
| 2003/0218222 | A1 | 11/2003 | Wager, III et al. |
| 2004/0038446 | A1 | 2/2004 | Takeda et al. |
| 2004/0127038 | A1 | 7/2004 | Carcia et al. |
| 2005/0017302 | A1 | 1/2005 | Hoffman |
| 2005/0057552 | A1 | 3/2005 | Foo et al. |
| 2005/0199959 | A1 | 9/2005 | Chiang et al. |
| 2005/0212737 | A1 | 9/2005 | Yoshihara et al. |
| 2006/0035452 | A1 | 2/2006 | Carcia et al. |
| 2006/0043377 | A1 | 3/2006 | Hoffman et al. |
| 2006/0091793 | A1 | 5/2006 | Baude et al. |
| 2006/0108529 | A1 * | 5/2006 | Saito ................. H01L 27/14601 250/338.4 |
| 2006/0108636 | A1 | 5/2006 | Sano et al. |
| 2006/0110867 | A1 | 5/2006 | Yabuta et al. |
| 2006/0113536 | A1 | 6/2006 | Kumomi et al. |
| 2006/0113539 | A1 | 6/2006 | Sano et al. |
| 2006/0113549 | A1 | 6/2006 | Den et al. |
| 2006/0113565 | A1 | 6/2006 | Abe et al. |
| 2006/0169973 | A1 | 8/2006 | Isa et al. |
| 2006/0170111 | A1 | 8/2006 | Isa et al. |
| 2006/0197092 | A1 | 9/2006 | Hoffman et al. |
| 2006/0208977 | A1 | 9/2006 | Kimura |
| 2006/0228974 | A1 | 10/2006 | Thelss et al. |
| 2006/0231882 | A1 | 10/2006 | Kim et al. |
| 2006/0238135 | A1 | 10/2006 | Kimura |
| 2006/0244107 | A1 | 11/2006 | Sugihara et al. |
| 2006/0284171 | A1 | 12/2006 | Levy et al. |
| 2006/0284172 | A1 | 12/2006 | Ishii |
| 2006/0292777 | A1 | 12/2006 | Dunbar |
| 2007/0024187 | A1 | 2/2007 | Shin et al. |
| 2007/0046191 | A1 | 3/2007 | Saito |
| 2007/0052025 | A1 | 3/2007 | Yabuta |
| 2007/0054507 | A1 | 3/2007 | Kaji et al. |
| 2007/0090365 | A1 | 4/2007 | Hayashi et al. |
| 2007/0108446 | A1 | 5/2007 | Akimoto |
| 2007/0152217 | A1 | 7/2007 | Lai et al. |
| 2007/0172591 | A1 | 7/2007 | Seo et al. |
| 2007/0187678 | A1 | 8/2007 | Hirao et al. |
| 2007/0187760 | A1 | 8/2007 | Furuta et al. |
| 2007/0194379 | A1 | 8/2007 | Hosono et al. |
| 2007/0252928 | A1 | 11/2007 | Ito et al. |

(56) References Cited

U.S. PATENT DOCUMENTS

| | | |
|---|---|---|
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0017854 A1 | 1/2008 | Marks et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0055218 A1 | 3/2008 | Tsuda et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0106526 A1 | 5/2008 | Chen |
| 2008/0128689 A1 | 6/2008 | Lee et al. |
| 2008/0129195 A1 | 6/2008 | Ishizaki et al. |
| 2008/0158137 A1 | 7/2008 | Yoshida |
| 2008/0158217 A1 | 7/2008 | Hata et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0045397 A1 | 2/2009 | Iwasaki |
| 2009/0068773 A1 | 3/2009 | Lai et al. |
| 2009/0073325 A1 | 3/2009 | Kuwabara et al. |
| 2009/0102813 A1 | 4/2009 | Mamba et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0179199 A1 | 7/2009 | Sano et al. |
| 2009/0261325 A1 | 10/2009 | Kawamura et al. |
| 2009/0267064 A1 | 10/2009 | Yano et al. |
| 2009/0278122 A1 | 11/2009 | Hosono et al. |
| 2009/0280600 A1 | 11/2009 | Hosono et al. |
| 2010/0033450 A1 | 2/2010 | Koyama et al. |
| 2010/0065840 A1 | 3/2010 | Yamazaki et al. |
| 2010/0065844 A1 | 3/2010 | Tokunaga |
| 2010/0079509 A1 | 4/2010 | Yao et al. |
| 2010/0092800 A1 | 4/2010 | Itagaki et al. |
| 2010/0109002 A1 | 5/2010 | Itagaki et al. |
| 2010/0110040 A1 | 5/2010 | Kim et al. |
| 2010/0127997 A1 | 5/2010 | Park et al. |
| 2010/0140614 A1* | 6/2010 | Uchiyama ......... H01L 21/28291 257/43 |
| 2010/0267198 A1 | 10/2010 | Yabuta et al. |
| 2010/0295821 A1 | 11/2010 | Chang et al. |
| 2011/0024739 A1* | 2/2011 | Shu .................. H01L 27/14659 257/43 |
| 2011/0025635 A1 | 2/2011 | Lee |
| 2011/0037914 A1 | 2/2011 | Noguchi et al. |
| 2011/0095288 A1 | 4/2011 | Morosawa et al. |
| 2013/0140575 A1 | 6/2013 | Asano et al. |
| 2014/0368486 A1 | 12/2014 | Hata et al. |
| 2015/0349099 A1 | 12/2015 | Yamazaki et al. |
| 2016/0380111 A1 | 12/2016 | Yamazaki et al. |
| 2017/0033228 A1 | 2/2017 | Yamazaki et al. |
| 2017/0236943 A1 | 8/2017 | Yamazaki et al. |
| 2017/0323957 A1 | 11/2017 | Yamazaki et al. |

FOREIGN PATENT DOCUMENTS

| | | |
|---|---|---|
| CN | 101561730 A | 10/2009 |
| CN | 101598995 A | 12/2009 |
| CN | 101620328 A | 1/2010 |
| CN | 101663758 A | 3/2010 |
| DE | 102004063777 | 9/2005 |
| EP | 1122792 A | 8/2001 |
| EP | 1280129 A | 1/2003 |
| EP | 1296174 A | 3/2003 |
| EP | 1737044 A | 12/2006 |
| EP | 1921681 A | 5/2008 |
| EP | 1939842 A | 7/2008 |
| EP | 2141742 A | 1/2010 |
| EP | 2151811 A | 2/2010 |
| EP | 2226847 A | 9/2010 |
| EP | 2339639 A | 6/2011 |
| EP | 2816607 A | 12/2014 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 10-222136 A | 8/1998 |
| JP | 11-505377 | 5/1999 |
| JP | 2000-044236 A | 2/2000 |
| JP | 2000-150900 A | 5/2000 |
| JP | 2001-022508 A | 1/2001 |
| JP | 2001-036087 A | 2/2001 |
| JP | 2001-117115 A | 4/2001 |
| JP | 2001-143560 A | 5/2001 |
| JP | 2001-292276 A | 10/2001 |
| JP | 2001-312253 A | 11/2001 |
| JP | 2002-076356 A | 3/2002 |
| JP | 2002-140052 A | 5/2002 |
| JP | 2002-289859 A | 10/2002 |
| JP | 2002-333870 A | 11/2002 |
| JP | 2003-044011 A | 2/2003 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2005-077822 A | 3/2005 |
| JP | 2005-122450 A | 5/2005 |
| JP | 2006-053606 A | 2/2006 |
| JP | 2006-165529 A | 6/2006 |
| JP | 2006-165531 A | 6/2006 |
| JP | 2006-267982 A | 10/2006 |
| JP | 2007-103918 A | 4/2007 |
| JP | 2007-220820 A | 8/2007 |
| JP | 2008-060419 A | 3/2008 |
| JP | 2008-090312 A | 4/2008 |
| JP | 2008-098637 A | 4/2008 |
| JP | 2008-141119 A | 6/2008 |
| JP | 2008-181108 A | 8/2008 |
| JP | 2008-281988 A | 11/2008 |
| JP | 2009-015489 A | 1/2009 |
| JP | 2009-164757 A | 7/2009 |
| JP | 2009-167087 A | 7/2009 |
| JP | 2009-277701 A | 11/2009 |
| JP | 2009-290113 A | 12/2009 |
| JP | 2010-016163 A | 1/2010 |
| JP | 2010-040815 A | 2/2010 |
| JP | 2010-049206 A | 3/2010 |
| JP | 2010-056539 A | 3/2010 |
| JP | 2010-056540 A | 3/2010 |
| JP | 2010-056542 A | 3/2010 |
| JP | 2010-056546 A | 3/2010 |
| JP | 2010-061647 A | 3/2010 |
| JP | 2010-092036 A | 4/2010 |
| KR | 2007-0116053 A | 12/2007 |
| TW | 200813964 | 3/2008 |
| TW | 200822019 | 5/2008 |
| TW | 200941433 | 10/2009 |
| TW | 200945155 | 11/2009 |
| TW | I327708 | 7/2010 |
| TW | 201104545 | 2/2011 |
| WO | WO-2004/114391 | 12/2004 |
| WO | WO-2006/051993 | 5/2006 |
| WO | WO-2006/105028 | 10/2006 |
| WO | WO-2007/029844 | 3/2007 |
| WO | WO-2008/069286 | 6/2008 |
| WO | WO-2008/096768 | 8/2008 |
| WO | WO-2008/126879 | 10/2008 |
| WO | WO-2009/034953 | 3/2009 |

(56) References Cited

FOREIGN PATENT DOCUMENTS

| WO | WO-2009/131292 | 10/2009 |
| WO | WO-2009/139428 | 11/2009 |
| WO | WO-2010/029866 | 3/2010 |

OTHER PUBLICATIONS

International Search Report (Application No. PCT/JP2011/058748) dated May 10, 2011.
Fortunato.E et al., "Wide-Bandgap High-Mobility ZnO Thin-Film Transistors Produced at Room Temperature", Appl. Phys. Lett. (Applied Physics Letters), Sep. 27, 2004, vol. 85, No. 13, pp. 2541-2543.
Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.
Ikeda.T et al., "Full-Functional System Liquid Crystal Display Using CG-Silicon Technology", SID Digest '04 : SID International Symposium Digest of Technical Papers, 2004, vol. 35, pp. 860-863.
Nomura.K et al., "Room-Temperature Fabrication of Transparent Flexible Thin-Film Transistors Using Amorphous Oxide Semiconductors", Nature, Nov. 25, 2004, vol. 432, pp. 488-492.
Park.J et al., "Improvements in the Device Characteristics of Amorphous Indium Gallium Zinc Oxide Thin-Film Transistors by Ar Plasma Treatment", Appl. Phys. Lett. (Applied Physics Letters) , Jun. 26, 2007, vol. 90, No. 26, pp. 262106-1-262106-3.
Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.
Hayashi.R et al., "42.1: Invited Paper: Improved Amorphous In—Ga—Zn—O TFTS", SID Digest '08 : SID International Symposium Digest of Technical Papers, May 20, 2008, vol. 39, pp. 621-624.
Prins.M et al., "A Ferroelectric Transparent Thin-Film Transistor", Appl. Phys. Lett. (Applied Physics Letters) , Jun. 17, 1996, vol. 68, No. 25, pp. 3650-3652.
Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.
Kimizuka.N et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3—ZnGa2O4—ZnO System", Journal of Solid State Chemistry, Apr. 1, 1995, vol. 116, No. 1, pp. 170-178.
Nomura.K et al., "Thin-Film Transistor Fabricated in Single-Crystalline Transparent Oxide Semiconductor", Science, May 23, 2003, vol. 300, No. 5623, pp. 1269-1272.
Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.
Asakuma.N et al., "Crystallization and Reduction of Sol-Gel-Derived Zinc Oxide Films by Irradiation with Ultraviolet Lamp", Journal of Sol-Gel Science and Technology, 2003, vol. 26, pp. 181-184.
Osada.T et al., "15.2: Development of Driver-Integrated Panel using Amorphous In—Ga—Zn-Oxide TFT", SID Digest '09 : SID International Symposium Digest of Technical Papers, May 31, 2009, pp. 184-187.
Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.
Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.
Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.
Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.
Nowatari.H et al., "60.2: Intermediate Connector With Suppressed Voltage Loss for White Tandem OLEDS", SID Digest '09 : SID International Symposium Digest of Technical Papers, May 31, 2009, vol. 40, pp. 899-902.
Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.
Tsuda.K et al., "Ultra Low Power Consumption Technologies for Mobile TFT-LCDs", IDW '02 : Proceedings of the 9th International Display Workshops, Dec. 4, 2002, pp. 295-298.
Van de Walle.C, "Hydrogen as a Cause of Doping in Zinc Oxide", Phys. Rev. Lett. (Physical Review Letters), Jul. 31, 2000, vol. 85, No. 5, pp. 1012-1015.
Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.
Jeong.J et al., "3.1: Distinguised Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.
Park.J et al., "High performance amorphous oxide thin film transistors with self-aligned top-gate structure", IEDM 09: Technical Digest of International Electron Devices Meeting, Dec. 7, 2009, pp. 191-194.
Kurokawa.Y et al., "UHF RFCPUS on Flexible and Glass Substrates for Secure RFID Systems", Journal of Solid-State Circuits , 2008, vol. 43, No. 1, pp. 292-299.
Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.
Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.
Cho.D et al., "21.2:AL and SN-Doped Zinc Indium Oxide Thin Film Transistors for AMOLED Back-Plane", SID Digest '09 : SID International Symposium Digest of Technical Papers, May 31, 2009, pp. 280-283.
Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.
Jin.D et al., "65.2:Distinguished Paper: World-Largest (6.5") Flexible Full Color Top Emission AMOLED Display on Plastic Film and its Bending Properties", SID Digest '09 : SID International Symposium Digest of Technical Papers, May 31, 2009, pp. 983-985.
Sakata.J et al., "Development of 4.0-In. AMOLED Display With Driver Circuit Using Amorphous In—Ga—Zn-Oxide TFTS", IDW '09 : Proceedings of the 16th International Display Workshops, 2009, pp. 689-692.
Park.J et al., "Amorphous Indium-Gallium Zinc Oxide TFTS and Their Application for Large Size AMOLED", AM-FPD '08 Digest of Technical Papers, Jul. 2, 2008, pp. 275-278.
Parks.S et al., "Challenge to Future Displays: Transparent AM-OLED Driven by Peald Grown ZnO TFT", IMID '07 Digest, 2007, pp. 1249-1252.
Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.
Osada.T et al., "Development of Driver-Integrated Panel Using Amorphous In—Ga—Zn-Oxide TFT", AM-FPD '09 Digest of Technical Papers, Jul. 1, 2009, pp. 33-36.
Hirao.T et al., "Novel Top-Gate Zinc Oxide Thin-Film Transistors (ZnO TFTS) for AMLCDS", J. Soc. Inf. Display (Journal of the Society for Information Display), 2007, vol. 15, No. 1, pp. 17-22.

(56) References Cited

OTHER PUBLICATIONS

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.

Ohara.H et al., "21.3:4.0 In. QVGA AMOLED Display Using In—Ga—Zn-Oxide TFTS With a Novel Passivation Layer", SID Digest '09 : SID International Symposium Digest of Technical Papers, May 31, 2009, pp. 284-287.

Miyasaka.M, "SUFTLA Flexible Microelectronics on Their Way to Business", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Asaoka.Y et al., "29.1:Polarizer-Free Reflective LCD Combined with Ultra Low-Power Driving Technology", SID Digest '09 : SID International Symposium Digest of Technical Papers, May 31, 2009, pp. 395-398.

Lee.H et al., "Current Status of, Challenges to, and Perspective View of AM-OLED", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Nakamura.M, "Synthesis of Homologous Compound with New Long-Period Structure", NIRIM Newsletter, Mar. 1, 1995, vol. 150, pp. 1-4.

Kikuchi.H et al., "Polymer-Stabilized Liquid Crystal Blue Phases", Nature Materials, Sep. 2, 2002, vol. 1, pp. 64-68.

Kimizuka.N et al., "SPINEL,YBFE2O4, and YB2FE3O7 Types of Structures for Compounds in the In2O3 and SC2O3—A2O3—BO Systems [A; Fe, Ga, or Al; B: Mg, Mn, Fe, Ni, Cu, or Zn] at Temperatures over 1000° C", Journal of Solid State Chemistry, 1985, vol. 60, pp. 382-384.

Kitzerow.H et al., "Observation of Blue Phases in Chiral Networks", Liquid Crystals, 1993, vol. 14, No. 3, pp. 911-916.

Costello.M et al., "Electron Microscopy of a Cholesteric Liquid Crystal and its Blue Phase", Phys. Rev. A (Physical Review. A), May 1, 1984, vol. 29, No. 5, pp. 2957-2959.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.

Janottia.A et al., "Native Point Defects in ZnO", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Janotti.A et al., "Oxygen Vacancies In ZnO", Appl. Phys. Lett. (Applied Physics Letters) , 2005, vol. 87, pp. 122102-1-122102-3.

Oba.F et al., "Defect energetics in ZnO: A hybrid Hartree-Fock density functional study", Phys. Rev. B (Physical Review. B), 2008, vol. 77, pp. 245202-1-245202-6.

Orita.M et al., "Amorphous transparent conductive oxide InGaO3(ZnO)m (m>4):a Zn4s conductor", Philosophical Magazine, 2001, vol. 81, No. 5, pp. 501-515.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays", IDW '08 : Proceedings of the 6th International Display Workshops, Dec. 3, 2008, pp. 581-584.

Kim.S et al., "High-Performance oxide thin film transistors passivated by various gas plasmas", 214th ECS Meeting, 2008, No. 2317, ECS.

Clark.S et al., "First Principles Methods Using CASTEP", Zeitschrift fur Kristallographie, 2005, vol. 220, pp. 567-570.

Lany.S et al., "Dopability, Intrinsic Conductivity, and Nonstoichiometry of Transparent Conducting Oxides", Phys. Rev. Lett. (Physical Review Letters), Jan. 26, 2006, vol. 98, pp. 045501-1-045501-4.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator", Appl. Phys. Lett. (Applied Physics Letters) , Sep. 1, 2003, vol. 83, No. 9, pp. 1755-1757.

Chinese Office Action (Application No. 201180021087.5) dated Dec. 31, 2014.

Taiwanese Office Action (Application No. 100114650) dated Sep. 24, 2015.

Korean Office Action (Application No. 2012-7030483) dated Feb. 20, 2017.

German Office Action (Application No. 112011101475.9) dated Aug. 22, 2017.

Taiwanese Office Action (Application No. 106119110) dated Jan. 18, 2018.

Chinese Office Action (Application No. 201610205073.3) dated Mar. 28, 2018.

\* cited by examiner 1651
1652    1650

1652

SEMICONDUCTOR DISPLAY DEVICE AND DRIVING METHOD THE SAME

CROSS-REFERENCE TO RELATED APPLICATIONS

This application is a continuation of U.S. application Ser. No. 13/094,397, filed Apr. 26, 2011, now allowed, which claims the benefit of a foreign priority application filed in Japan as Serial No. 2010-102891 on Apr. 28, 2010, both of which are incorporated by reference.

TECHNICAL FIELD

The present invention relates to an active-matrix semiconductor display device using a transistor and a driving method thereof.

BACKGROUND ART

A touch panel is a position input device which can detect a position indicated with a finger, a stylus, or the like and can generate a signal including the positional information. A display device which is obtained in such a manner that a touch panel overlaps with an image display area is referred to as a touch screen, and the display device can display an image in an image display region and can obtain as information which position in the image display region a user indicates. In addition, an example of a touch screen includes a touch screen in which a photoelectric conversion element called a photosensor is provided in an image display region and a position indicated by a user is detected by intensity of light. The touch screen has both functions as a position input device and as a display device; therefore, the touch screen has high operability and the size of an electronic device is easily reduced as compared to the case where a position input device such as a touchpad or a mouse is used.

An information display device having a touch panel and a liquid crystal display panel is described in Patent Document 1.

REFERENCE

[Patent Document 1] Japanese Published Patent Application No. 2001-022508

DISCLOSURE OF INVENTION

As described earlier, a touch screen has an advantage of easily reducing the size of an electronic device. A touch panel or a photosensor is added to a thin semiconductor display device such as a flat panel display, whereby the size or thickness of an electronic device can be reduced further. Therefore, semiconductor display devices to which touch panels are added can be expected to be applied not only to stationary electronic devices but also to various electronic devices including portable electronic devices.

Low power consumption is one of the important points in terms of evaluating the performance of a semiconductor display device, and a semiconductor display device having a touch panel or a photosensor is no exception in that point. In particular, when a portable electronic device such as a cellular phone is used, large power consumption of a semiconductor display device having a touch panel or a photosensor leads to a disadvantage of short continuous operation time; therefore, low power consumption is required.

Even in Patent Document 1, it is an object to reduce power consumption. Specifically, Patent Document 1 describes a structure in which the driving of a liquid crystal display panel is stopped when there is no touch panel key operation so as to reduce power consumption. However, it is necessary to limit the kinds of liquid crystal materials in order to achieve the above-mentioned structure in Patent Document 1; therefore, versatility is low. In addition, display layers corresponding to their respective colors are stacked in the above-described liquid crystal display panel in order to display a full color image; therefore, loss of light inside the panel is large, and display is dark.

In view of the foregoing problems, it is an object of the present invention to provide a semiconductor display device having a touch panel or a photosensor, which can prevent quality loss of an image and can reduce power consumption. Alternatively, it is an object of the present invention to provide a driving method of a semiconductor display device having a touch panel or a photosensor, which can prevent quality loss of an image and can reduce power consumption.

The present inventors have thought that it is usually easier for a user to specify an input position when an image displayed in an image display region is a still image rather than a moving image, just before the positional information is input to a semiconductor display device. They have focused on increasing a period in which a still image is displayed in the image display region because a standby period of an input of the positional information from the user tends to increase when the positional information is input to the semiconductor display device intermittently. The inventors have thought that there is room to reduce the power consumption of the semiconductor display device in the period in which a still image is displayed.

Thus, in a semiconductor display device according to one embodiment of the present invention, driving frequency when a still image is displayed just before an input of the positional information to a touch panel or a photosensor is lower than driving frequency when a moving image is displayed, whereby power consumption of the semiconductor display device is reduced. Alternatively, in a semiconductor display device according to one embodiment of the present invention, driving frequency when a still image is displayed after an input of the positional information to a touch panel or a photosensor is lower than driving frequency when a moving image is displayed, whereby power consumption of the semiconductor display device is reduced. With the above-mentioned structure, the power consumption can be reduced in a period in which an input of the positional information to the touch panel or the photosensor is in a standby period.

Further, in one embodiment of the present invention, a display element and an insulated gate field effect transistor with extremely low off-state current (hereinafter referred to simply as a transistor) for controlling the retention of voltage applied to the display element are provided in a pixel portion corresponding to an image display region of a semiconductor display device in order to achieve the above-mentioned structure. The transistor with extremely low off-state current is used, whereby the period in which voltage applied to the display element is held can be increased. Accordingly, for example, in the case where image signals each having the same image information are written to a pixel portion for some consecutive frame periods, like a still image, display of an image can be maintained even when driving frequency is low, in other words, the number of writing operations of an image signal for a certain period is reduced.

A channel formation region of the transistor includes a semiconductor material whose band gap is wider than that of a silicon semiconductor and whose intrinsic carrier density is lower than that of silicon. With a channel formation region including a semiconductor material having the above characteristics, a transistor with an extremely low off-state current can be achieved. As examples of such a semiconductor material, an oxide semiconductor having a band gap which is approximately twice or more as large as that of silicon can be given. The transistor having the above-mentioned structure is used as a switching element used for holding voltage applied to a display element, whereby leakage of charge from the display element can be prevented.

Specifically, a semiconductor display device according to one embodiment of the present invention includes a panel provided with a pixel portion and a driver circuit used for controlling an input of an image signal to the pixel portion, and a touch panel provided in a position overlapping with the panel in the pixel portion. The pixel portion includes a display element which performs display in accordance with voltage of an image signal to be input and a transistor used for controlling retention of the voltage. A channel formation region of the transistor contains a semiconductor material whose band gap is wider than that of a silicon semiconductor and whose intrinsic carrier density is lower than that of silicon, such as an oxide semiconductor, for example. In addition to the above-mentioned structure, driving frequency of the driver circuit, that is, the number of writing operations of an image signal for a certain period is changed in accordance with an operation signal input from the touch panel in the semiconductor display device according to one embodiment of the present invention.

Alternatively, a semiconductor display device according to one embodiment of the present invention includes a panel provided with a pixel portion and a driver circuit used for controlling an input of an image signal to the pixel portion. The pixel portion includes a pixel provided with a display element used for performing display in accordance with voltage of an image signal to be input and a transistor used for controlling retention of the voltage. Further, the pixel portion includes a photosensor, and the photosensor includes a transistor and a light-receiving element which has a function of generating an electrical signal when receiving light, such as a photodiode. A channel formation region of the transistor contains a semiconductor material whose band gap is wider than that of a silicon semiconductor and whose intrinsic carrier density is lower than that of silicon, such as an oxide semiconductor, for example. In addition to the above-mentioned structure, driving frequency of the driver circuit, that is, the number of writing operations of an image signal for a certain period is changed in accordance with an operation signal input from a touch panel in the semiconductor display device according to one embodiment of the present invention.

Note that an oxide semiconductor is metal oxide showing semiconductor characteristics including both of high mobility which is almost the same as that of microcrystalline silicon or polysilicon and uniform element characteristics which are characteristics of amorphous silicon. An oxide semiconductor highly-purified (a purified OS) by reduction in concentration of impurities such as moisture or hydrogen, which serves as electron donors (donors), is an i-type semiconductor (an intrinsic semiconductor) or a substantially i-type semiconductor. Therefore, a transistor including the above oxide semiconductor has a characteristic of extremely low off-state current or extremely low leakage current. Specifically, the concentration of hydrogen in the highly-purified oxide semiconductor, which is measured by secondary ion mass spectrometry (SIMS), is $5\times10^{19}/cm^3$ or less, preferably $5\times10^{18}/cm^3$ or less, more preferably $5\times10^{17}/cm^3$ or less, still more preferably less than $1\times10^{16}/cm^3$. In addition, the carrier density of the oxide semiconductor film, which is measured by Hall effect measurement, is less than $1\times10^{14}/cm^3$, preferably less than $1\times10^{12}/cm^3$, more preferably less than $1\times10^{11}/cm^3$. Furthermore, the band gap of the oxide semiconductor is 2 eV or more, preferably 2.5 eV or more, more preferably 3 eV or more. By using a highly-purified oxide semiconductor film with sufficiently reduced concentration of impurities such as moisture and hydrogen, off-state current or leakage current of the transistor can be reduced.

The analysis of the concentration of hydrogen in the oxide semiconductor film is described here. The concentrations of hydrogen in the oxide semiconductor film and the conductive film are measured by SIMS. It is known that it is difficult to obtain data in the proximity of a surface of a sample or in the proximity of an interface between stacked films formed using different materials by the SIMS in principle. Thus, in the case where distributions of the concentrations of hydrogen in the films in thickness directions are analyzed by SIMS, an average value in a region where the films are provided, the value is not greatly changed, and almost the same value can be obtained are employed as the concentration of hydrogen. Further, in the case where the thickness of the film is small, a region where almost the same value can be obtained cannot be found in some cases due to the influence of the concentration of hydrogen in the films adjacent to each other. In this case, the maximum value or the minimum value of the concentration of hydrogen in a region where the films are provided is employed as the concentration of hydrogen in the film. Furthermore, in the case where a mountain-shaped peak having the maximum value and a valley-shaped peak having the minimum value do not exist in the region where the films are provided, the value of the inflection point is employed as the concentration of hydrogen.

Various experiments can actually prove low off-state current of the transistor including the highly-purified oxide semiconductor film as an active layer. For example, even when an element has a channel width of $1\times10^6$ μm and a channel length of 10 μm, off-state current can be less than or equal to the measurement limit of a semiconductor parameter analyzer, i.e., less than or equal to $1\times10^{-13}$ A, at voltage (drain voltage) between the source electrode and the drain electrode of from 1 V to 10 V. In this case, it can be found that an off-state current density corresponding to a value obtained by dividing the off-state current by the channel width of the transistor is less than or equal to 100 zA/μm. Further, an off-state current density was measured by use of a circuit in which a capacitor and the transistor (the thickness of a gate insulating film is 100 nm) are connected to each other and charge which is supplied to or discharged from the capacitor is controlled by the transistor. In the measurement, the highly-purified oxide semiconductor film was used as a channel formation region in the transistor, and the off-state current density of the transistor was measured from change in the amount of electric charge of the capacitor per unit time. As a result, it was found that in the case where the voltage between the source electrode and the drain electrode of the transistor was 3 V, a much lower off-state current density, which is from 10 zA/μm to 100 zA/μm, was able to be obtained. Therefore, in the semiconductor display device according to one embodiment of the present invention, the off-state current density of the transistor including the highly-purified oxide semiconductor film as an active layer can be lower than or equal to 10 zA/μm, preferably lower than or equal to 1 zA/μm, or more preferably lower than or equal to 1 yA/μm, depending on the voltage between the source electrode and drain electrode. Accordingly, the transistor including the highly-purified oxide semiconductor film as an active layer has much lower off-state current than a transistor including silicon having crystallinity.

In addition, a transistor including a highly-purified oxide semiconductor shows almost no temperature dependence of off-state current. This is because the conductivity type is made to be as close to an intrinsic type as possible by removing impurities which become electron donors (donors) in the oxide semiconductor to highly purify the oxide semiconductor, so that the Fermi level positions in the center of the forbidden band. This also results from the fact that the oxide semiconductor has an energy gap of 3 eV or more and includes very few thermally excited carriers. In addition, the source electrode and the drain electrode are in a degenerated state, which is also a factor for showing no temperature dependence. The transistor is operated mainly with carriers which are injected from the degenerated source electrode into the oxide semiconductor, and the above independence of off-state current in temperature can be explained by independence of the carrier density in temperature.

As the oxide semiconductor, a quaternary metal oxide such as an In—Sn—Ga—Zn—O-based oxide semiconductor, a ternary metal oxide such as an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, and a Sn—Al—Zn—O-based oxide semiconductor, or a binary metal oxide such as an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, an In—Ga—O-based oxide semiconductor, an In—O-based oxide semiconductor, a Sn—O-based oxide semiconductor, and a Zn—O-based oxide semiconductor can be used. Note that in this specification, for example, an In—Sn—Ga—Zn—O-based oxide semiconductor means a metal oxide including indium (In), tin (Sn), gallium (Ga), and zinc (Zn), and there is no particular limitation on the composition ratio. The above oxide semiconductor may include silicon.

Moreover, oxide semiconductors can be represented by the chemical formula, $InMO_3(ZnO)_m$ (m >0). Here, M represents one or more metal elements selected from Ga, Al, Mn, and Co.

In one embodiment of the present invention, driving frequency when a still image is display can be lower than driving frequency when a moving image is displayed at the time of an input of the positional information to a semiconductor display device. Therefore, a semiconductor display device having a touch panel, which can prevent quality loss of an image and can reduce power consumption, can be achieved. Further, a driving method of a semiconductor display device which can prevent quality loss of an image and can reduce power consumption can be achieved.

BEST MODE FOR CARRYING OUT THE INVENTION

Hereinafter, embodiments and example of the present invention will be described in detail with reference to the accompanying drawings. However, the present invention is not limited to the following description and it is easily understood by those skilled in the art that the mode and details can be changed in various ways without departing from the spirit and scope of the present invention. Accordingly, the present invention should not be construed as being limited to the description of the embodiments and example below.

Note that the semiconductor display devices of the present invention include the following in its category: liquid crystal display devices, light-emitting devices in which a light-emitting element typified by an organic light-emitting element (OLED) is provided for each pixel, electronic paper, digital micromirror devices (DMDs), plasma display panels (PDPs), field emission displays (FEDs), and other semiconductor display devices in which a transistor is included in a pixel portion.

(Embodiment 1)

Figure 1:
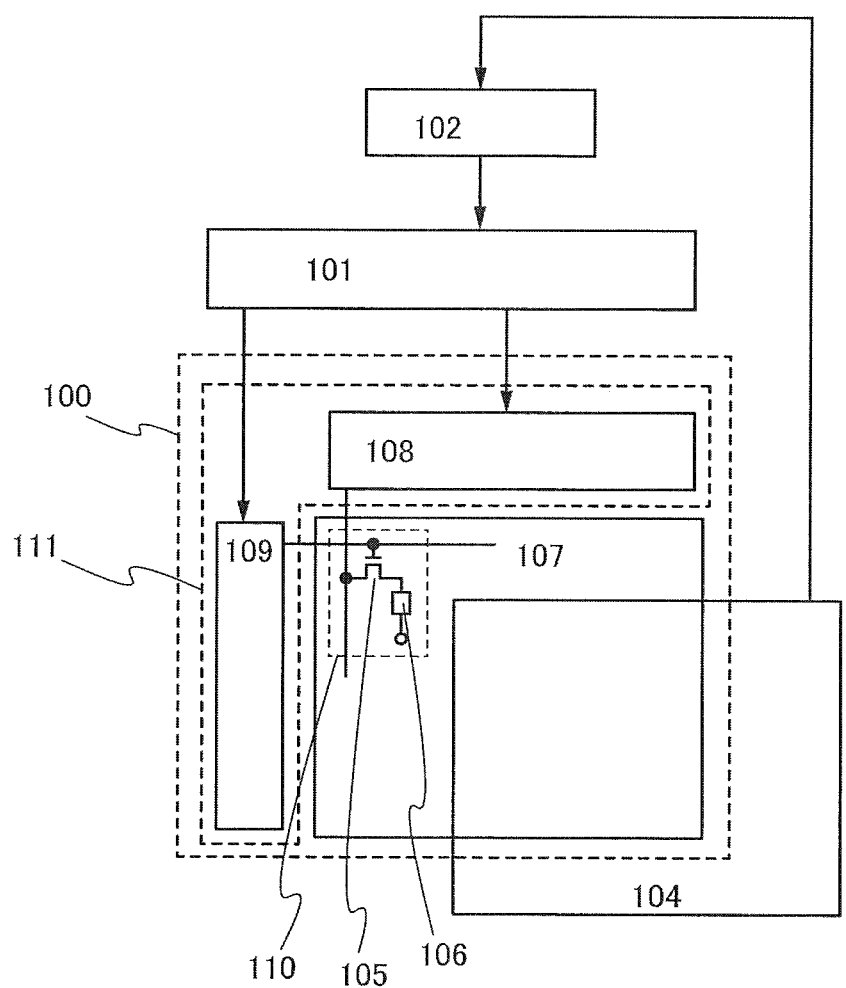
FIG. 1 is a block diagram of a structure of a semiconductor display device.

FIG. 1 is a block diagram illustrating a structure of a semiconductor display device according to one embodiment of the present invention. Note that in the block diagram in this specification, circuits are classified in accordance with their functions and separated blocks are illustrated. However, it is difficult to classify actual circuits according to their functions completely and it is possible for one circuit to have a plurality of functions.

A semiconductor display device illustrated in FIG. 1 includes a panel 100, a display control circuit 101, a CPU 102, and a touch panel 104. Further, the semiconductor display device according to one embodiment of the present invention may include a touch panel control circuit.

The panel 100 includes a pixel portion 107 provided with pixels 110 each including a transistor 105 and a display element 106, and a driver circuit 111 which controls operation of the pixel portion 107, such as a signal line driver circuit 108, a scan line driver circuit 109, and the like. The scan line driver circuit 109 selects the pixel 110 included in the pixel portion 107 by controlling switching of the transistor 105. The signal line driver circuit 108 controls an input of an image signal to the display element 106 of the selected pixel 110.

The display control circuit 101 controls supply of an image signal, a driving signal, and a power supply potential to the signal line driver circuit 108 and the scan line driver circuit 109 included in the panel 100. Note that although the driving signal is a signal used for controlling operation of the driver circuit 111 with the use of a pulse, the kind of driving signal required for the operation varies depending on the structure of the driver circuit 111. Examples of driving signals include a start signal and a clock signal which are used for controlling operation of a shift register, and a latch signal used for controlling timing of data retention in a memory circuit. The signal line driver circuit 108 and the scan line driver circuit 109 can perform the above-described operation by the supply of the driving signal and the power supply potential.

The touch panel 104 is arranged so as to overlap with the pixel portion 107 of the panel 100. When a user brings a stylus, the user's finger, or the like into contact with the touch panel 104 or close to the vicinity of the touch panel 104, an operation signal including the positional information is generated. The touch panel control circuit performs various kinds of signal processing on the operation signal input from the touch panel 104, such as AD conversion or amplitude processing, and sends the processed operation signal to the CPU 102.

The operation signal includes the positional information used for identifying which position of the pixel portion 107 is selected by the user. The CPU 102 uses the above-described positional information included in the operation signal, and selects whether or not an image is rewritten in the pixel portion 107. Then, in accordance with the result of the selection, the operation of the display control circuit 101 is controlled. Specifically, whether or not the driving signal and the power supply potential are supplied to the driver circuit 111 is selected. In addition, for example, in the case where rewriting is performed, an image signal corresponding to the above-described positional information is read from the memory circuit and transmits it to the display control circuit 101. Note that the above-described memory circuit may be provided inside the CPU 102 or may be provided outside the CPU 102. Alternatively, the above-described memory circuit may be provided outside the semiconductor display device.

Note that a correspondence relation between the position indicated in the touch panel 104 and the position of the pixel portion 107 which overlaps with the position indicated in the touch panel 104 is extracted or corrected in advance by position corrective operation called calibration. The data of the correspondence relation is held in the memory circuit included in the CPU 102 or the memory circuit included in the touch panel control circuit.

Note that although the structure of the semiconductor display device with the use of the touch panel 104 is illustrated in FIG. 1, a photosensor instead of the touch panel 104 can be used in the semiconductor display device according to one embodiment of the present invention. The photosensor together with the pixel 110 can be provided in the pixel portion 107. Unlike the case where the touch panel 104 is used, the above-described position correction operation is not always required in the case where the photosensor is used.

In one embodiment of the present invention, after rewriting is performed by an input of the operation signal to the touch panel 104 or the photosensor, the driving frequency of the driver circuit 111 is changed whether an image displayed in the pixel portion 107 is a still image or a moving image. Specifically, the driving frequencies of the signal line driver circuit 108 and the scan line driver circuit 109 when a still image is displayed is lower than the above-described driving frequency when a moving image is displayed. With the above-mentioned structure, power consumption of the semiconductor display device can be reduced.

Further, in one embodiment of the present invention, a transistor with extremely low off-state current is used in the pixel portion 107 in order to control retention of voltage applied to the display element 106. The transistor with extremely low off-state current is used, whereby the period in which voltage applied to the display element 106 is held can be increased. Therefore, for example, in the case where image signals each having the same image information are written to the pixel portion 107 for some consecutive frame periods, like a still image, display of an image can be maintained even when driving frequency is low, in other words, the number of writing operations of image signals to the pixel portion 107 for a certain period is reduced. For example, the above-described transistor in which a highly-purified oxide semiconductor film is used as an active layer is employed, whereby an interval between writing operations of image signals can be 10 seconds or more, preferably 30 seconds or more, further preferably 1 minute or more. As the interval between writing operations of image signals is made longer, power consumption can be further reduced.

Unless otherwise specified, in this specification, in the case of an n-channel (p-channel) transistor, an off-state current is a current which flows between a source electrode and a drain electrode when a potential of the drain electrode is higher (lower) than that of the source electrode or that of a gate electrode while a potential of the gate electrode is less (greater) than or equal to zero when a reference potential is the potential of the source electrode. In addition, unless otherwise specified, leakage current means current which flows between the source electrode or the drain electrode and the gate electrode through an insulating film.

Figure 3:
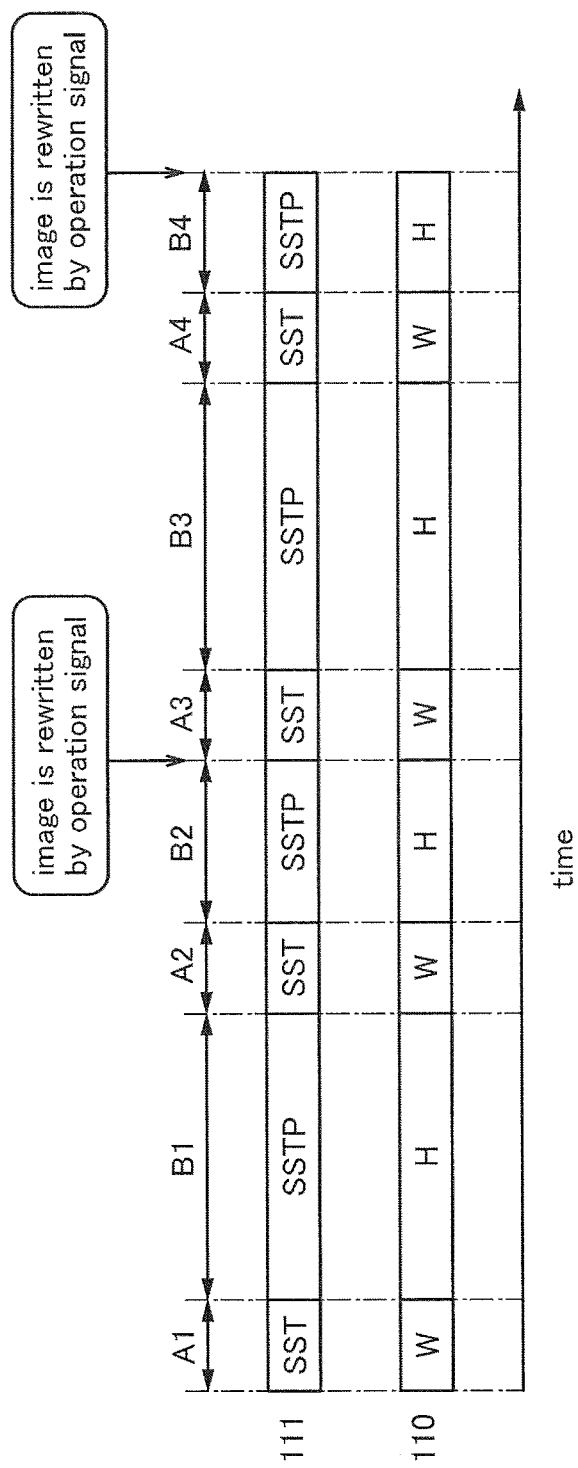
FIG. 3 is a timing diagram of operation of a semiconductor display device.

The operation of the semiconductor display device according to one embodiment of the present invention can be described using the following periods: a period in which a moving image is displayed, and a period in which a still image is displayed. A specific example of operation of the pixel 110 and the driver circuit 111 when a still image is displayed will be described with reference to FIG. 3. The time variation in an operation state of the pixel 110 and the time variation in an operation state of the driver circuit 111 are schematically illustrated in FIG. 3.

In the period in which a still image is displayed, a period A in which an image signal IMG is written to the pixel 110 and a period B in which the display element 106 maintains the display of a gray scale by the image signal IMG appear alternately. In FIG. 3, the case where four periods A of period A1 to period A4 and four periods B of period B1 to period B4 appear alternately is illustrated. Specifically, in FIG. 3, the periods are arranged in the following order: the period A1, the period B1, the period A2, the period B2, the period A3, the period B3, the period A4, and the period B4.

In each period A, the driving signal and the power supply potential are supplied to the driver circuit 111, whereby each driver circuit such as the signal line driver circuit 108 and the scan line driver circuit 109 operates. In FIG. 3, the state in which the driver circuit 111 operates is denoted by SST.

When the scan line driver circuit 109 is in an operation state, a scan signal SCN is input from the scan line driver circuit 109 to the pixel portion 107, whereby the pixel 110 is selected sequentially. Specifically, the transistor 105 is turned on by the scan signal SCN, so that the pixel 110 is selected. When the signal line driver circuit 108 is in an operation state, the image signal IMG is input from the signal line driver circuit 108 to the pixel 110 selected by the scan line driver circuit 109. Specifically, the image signal IMG is input to the display element 106 through the transistor 105 which is in an on state.

When the image signal IMG is input to the selected pixel 110, the display element 106 displays a gray scale in accordance with the image signal IMG. The number of gray scales displayed by the display element 106 may be a binary or may be a multi-value of three values or more. A display state of the gray scale by the image signal IMG is held for a certain period.

The above-described input of the image signal IMG to the pixel 110 is similarly performed in the other pixels 110. A display state is set in all the pixels, and an image based on data of the image signal IMG is displayed in the whole pixel portion 107. The state in which the data of the image signal IMG is written to all the pixels 110 and a display state is set is denoted by W in FIG. 3.

Next, in each period B, the supply of the driving signal and the power supply potential to the driver circuit 111 is stopped, whereby each driver circuit such as the signal line driver circuit 108 and the scan line driver circuit 109 is in a stopped state. In FIG. 3, the state in which the driver circuit 111 stops operation is denoted by SSTP. The signal line driver circuit 108 is in a stopped state, whereby an input of the image signal IMG to the pixel portion 107 is stopped.

In addition, the scan line driver circuit 109 is in a stopped state, whereby an input of the scan signal SCN to the pixel portion 107 is stopped. Therefore, the selection of the pixel 110 by the scan line driver circuit 109 is stopped, so that the display element 106 included in the pixel 110 holds a display state set in the period A just before the period B. The state in which the display of the gray scale by the display element 106 is held is denoted by H in FIG. 3.

Specifically, in FIG. 3, a display state set in the period A1 is held in the period B1. A display state set in the period A2 is held in the period B2. A display state set in the period A3 is held in the period B3. A display state set in the period A4 is held in the period B4.

In one embodiment of the present invention, as described above, the transistor 105 with extremely low off-state current is used; therefore, the display state in each period B can be held for 10 seconds or more, preferably 30 seconds or more, further preferably 1 minute or more.

In one embodiment of the present invention, the length of each period B can be changed as appropriate in accordance with timing of a pulse of the operation signal input to the touch panel 104 or the photosensor. For example, the case where the timing of the end of the period B2 is set by the pulse of the operation signal is illustrated in FIG. 3. In FIG. 3, the period B2 is forcibly terminated by the input of the pulse of the operation signal; then, the period A3 starts. Accordingly, in the case of FIG. 3, the period B2 is shorter than the period B which is automatically terminated regardless of the input of the pulse of the operation signal, such as the period B1 and the period B3.

Note that there is a limitation on a period in which the display element can maintain a display state. Accordingly, in consideration of the period in which the display element can maintain a display state, the maximum length of each period B in a period in which the pulse of the operation signal is not input is set in advance. That is, in the case where the period in which a still image is displayed is longer than the maximum length of each period B, the period B is automatically terminated even when there is no input of the pulse of the operation signal. Then, the same image signal IMG is input to the pixel portion 107 again in the next period A, and the image held in the period B just before that period A is displayed again in the whole pixel portion 107.

In one embodiment of the present invention, in a period in which a still image is displayed, the number of writing operations of the image signal IMG to the pixel portion 107 can be significantly reduced while the display of an image is maintained. Accordingly, the driving frequency of the driver circuit can be drastically reduced, and the power consumption of the semiconductor display device can be reduced.

Note that in the period in which a moving image is displayed, the image signal IMG is written to the selected pixel 110 in a manner similar to that in the period in which a still image is displayed. Then, the display element 106 displays a gray scale in accordance with the image signal IMG However, unlike the period in which a still image is displayed, the operation of the driver circuit is not always stopped after the image signal IMG is written to all the pixels 110 and the display state is set.

Next, the flow of an input of the operation signal to the touch panel 104 and the operation of rewriting an image in the pixel portion 107 performed in accordance with the input is described. Note that in FIG. 2, although the case where the touch panel 104 is used is given as an example, similar operation can be performed even in the case where a photosensor instead of the touch panel 104 is used.

Figure 2:
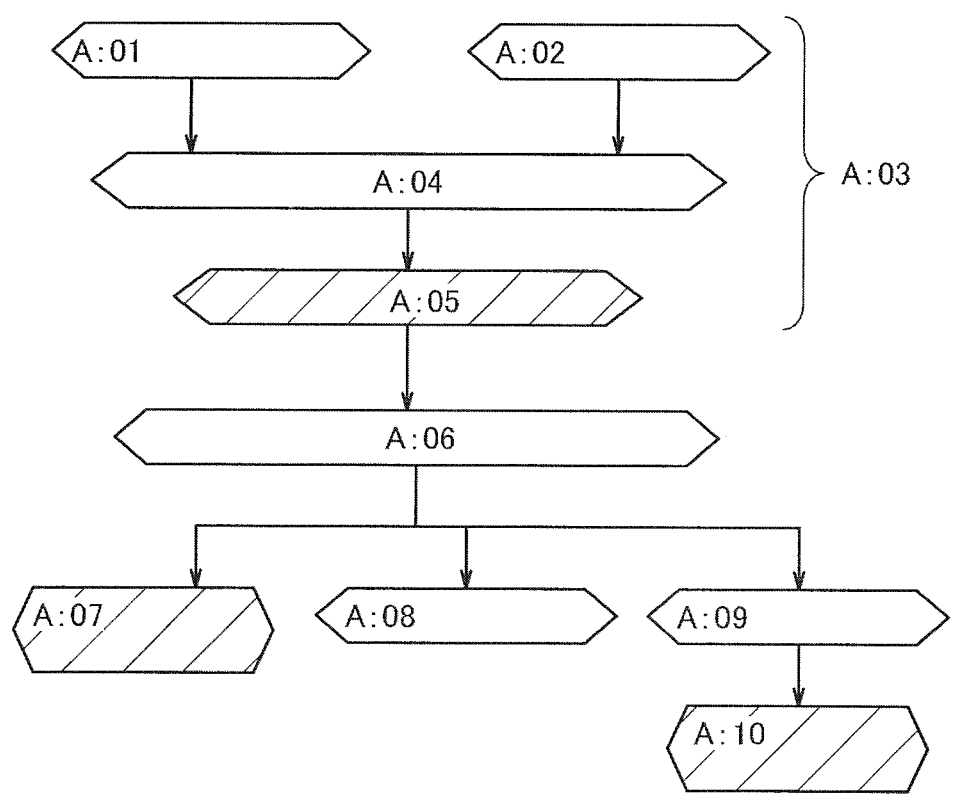
FIG. 2 is a flow chart of operation of a semiconductor display device.

FIG. 2 is a flow chart illustrating a flow of operation of the semiconductor display device. In FIG. 2, before the user inputs the positional information to the touch panel 104, the case where a still image is displayed in the pixel portion 107 (A01: display of a still image) and the case where a moving image is displayed (A02: display of a moving image) are assumed.

In one embodiment of the present invention, first, an image displayed in the pixel portion 107 is rewritten to a still image for input used for performing an input to the touch panel 104 (A03: shift to an input mode). Specifically, the operation signal is input to the touch panel 104 (A04: input of the operation signal to the touch panel), whereby a still image for input is displayed in the pixel portion 107 (A05: display of a still image for input). In the case where a moving image is displayed (A02: display of a moving image), an image is rewritten to a still image for input, whereby the user easily specifies an input position.

Next, based on the still image for input, the operation signal is input to the touch panel 104 (A06: input of the operation signal to the touch panel). The operation signal is input to the touch panel 104, whereby an image signal is written to the pixel portion 107 and an image displayed in the pixel portion 107 is rewritten. The image displayed by this rewriting is set in accordance with the positional information included in the operation signal. In FIG. 2, the case where a still image for input is displayed again (A07: display of a still image for input) and the case where an image showing information obtained by the input of the operation signal is displayed (A08: display of a result) are illustrated. In addition, as illustrated in FIG. 2, a still image for input may be automatically displayed again (A10: display of a still image for input) even when the operation signal is not input after the image showing the information obtained by the input of the operation signal is displayed for a certain period (A09: display of a result).

Note that an image showing the information obtained by the input of the operation signal may be a still image or a moving image.

In one embodiment of the present invention, a driving method of stopping the operation of the driver circuit as illustrated in FIG. 3 is adopted in a display period of a still image by the input of the operation signal to the touch panel 104. In the flow chart illustrated in FIG. 2, the above-described driving method can be used for (A05: display of a still image for input), (A07: display of a still image for input), or (A10: display of a still image for input), for example.

Further, the driving method of stopping the operation of the driver circuit as illustrated in FIG. 3 may also be adopted even in the case where an image showing the information obtained by the input of the operation signal is a still image.

With the above-mentioned structure, when the user intermittently inputs the operation signal to the touch panel 104, the operation of the driver circuit can be stopped at the time of displaying a still image performed in an interval and power consumption can be reduced.

(Embodiment 2)

In this embodiment, in the semiconductor display device illustrated in FIG. 1, a driving signal and a power supply potential which are transmitted from the display control circuit 101 to the driver circuit 111 in a period in which a still image is displayed will be described with reference to FIG. 4.

A start signal SP, a clock signal CK, and a power supply potential Vp are input to the display control circuit 101. In addition, a control signal GDCTL and a control signal SDCTL are input from the CPU 102 to the display control circuit 101. The control signal GDCTL is a signal for controlling drive of the scan line driver circuit 109 and the control signal SDCTL is a signal for controlling drive of the signal line driver circuit 108. The display control circuit 101 supplies a signal or potential which is input such as the start signal SP, the clock signal CK, or the power supply potential Vp to the scan line driver circuit 109 or the signal line driver circuit 108 in accordance with the control signal GDCTL and the control signal SDCTL.

Note that a start signal SP input to the scan line driver circuit 109 is a start signal GSP, and a start signal SP input to the signal line driver circuit 108 is a start signal SSP. In addition, a clock signal CK input to the scan line driver circuit 109 is a clock signal GCK, and a clock signal CK input to the signal line driver circuit 108 is a clock signal SCK. A power supply potential Vp input to the scan line driver circuit 109 is a power supply potential GVp, and a power supply potential Vp input to the signal line driver circuit 108 is a power supply potential SVp.

Note that the start signal GSP is a pulse signal corresponding to the vertical synchronization frequency, and the start signal SSP is a pulse signal corresponding to one gate selection period.

Further, the clock signal GCK is not limited to one clock signal and a plurality of clock signals having phases different from each other may be used as the clock signal GCK. When a plurality of clock signals is used as the clock signal GCK, operation speed of the scan line driver circuit 109 can be improved. Further, the clock signal SCK is not limited to one clock signal and a plurality of clock signals having phases different from each other may be used as the clock signal SCK. When a plurality of clock signals having phases different from each other is used as the clock signal SCK, operation speed of the signal line driver circuit 108 can be improved. Note that a common clock signal CK may be used as the clock signal GCK and the clock signal SCK.

Next, an example of a driving method of a semiconductor display device according to one embodiment of the present invention in the case where the above-described driving signal and power supply potential are used is described. FIG. 4 illustrates time variation in potentials of the control signal GDCTL, the power supply potential GVp, the clock signal GCK, the start signal GSP, the control signal SDCTL, the power supply potential SVp, the clock signal SCK, and the start signal SSP. Note that in this embodiment, as an example, the power supply potential GVp and the power supply potential SVp are a common power supply potential, the clock signal GCK is one clock signal, the clock signal SCK is one clock signal, and the control signal GDCTL, the control signal SDCTL, the start signal GSP, and the start signal SSP are all binary digital signals.

Figure 4:
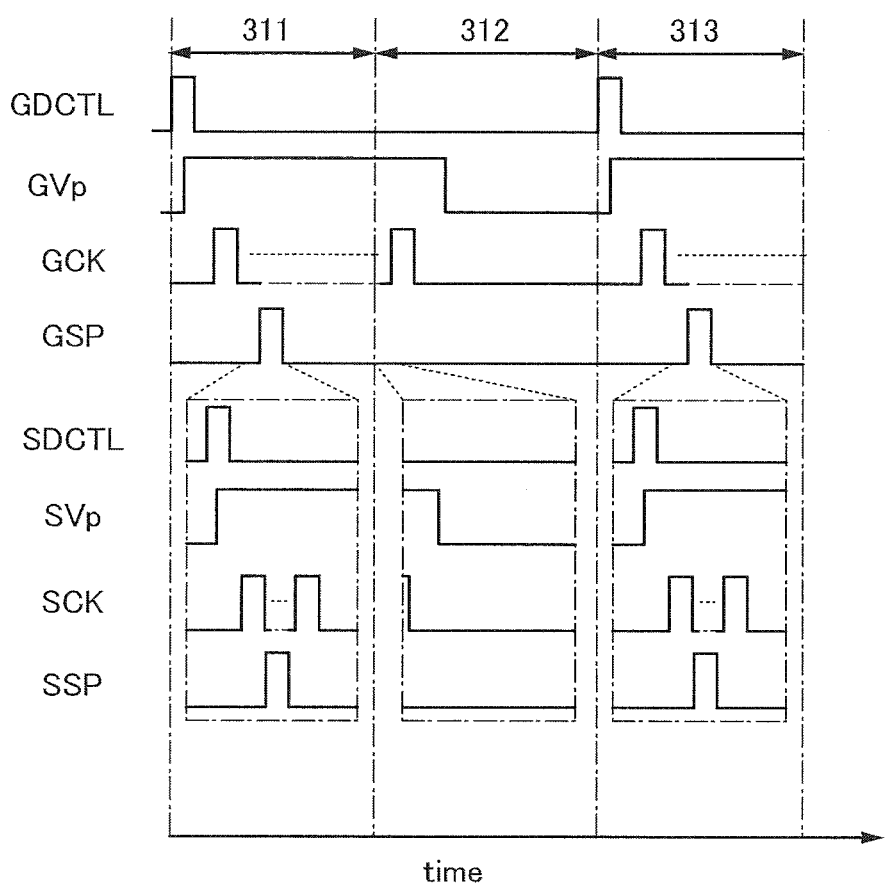
FIG. 4 is a timing diagram of a driving signal and a power supply potential.

In FIG. 4, a period can be divided into a frame period 311 in which a moving image is displayed, a frame period 312 in which a still image is displayed, and a frame period 313 in which a moving image is displayed.

First, in the frame period 311, the display control circuit 101 starts an output of the power supply potential GVp, the start signal GSP, and the clock signal GCK when the pulse of the control signal GDCTL is input. Specifically, the output of the power supply potential GVp is started first. After that, when the output of the power supply potential GVp is stabilized, the output of the clock signal GCK is started; then the output of the start signal GSP is started. Note that the potential of a wiring is preferably stabilized in such a manner that, just before the output of the clock signal GCK is started, a potential of the clock signal GCK at high level is applied to the wiring to which the clock signal GCK is input. By the above-described method, malfunction of the scan line driver circuit 109 in starting operation can be prevented.

Further, in the frame period 311, the display control circuit 101 starts the output of the power supply potential SVp, the start signal SSP, and the clock signal SCK when the pulse of the control signal SDCTL is input. Specifically, the output of the power supply potential SVp is started first. After that, when the output of the power supply potential SVp is stabilized, the output of the clock signal SCK is started; then the output of the start signal SSP is started. Note that the potential of a wiring is preferably stabilized in such a manner that, just before the output of the clock signal SCK is started, a potential of the clock signal SCK at high level is applied to the wiring to which the clock signal SCK is input. By the above-described method, malfunction of the signal line driver circuit 108 in starting operation can be prevented.

When the scan line driver circuit 109 starts operation, the scan signal SCN is input from the scan line driver circuit 109 to the scan line, whereby pixels in the pixel portion 107 are sequentially selected. Then, when the signal line driver circuit 108 starts operation, the image signal IMG is input from the signal line driver circuit 108 to the selected pixel through the signal line. In the pixel to which the image signal IMG is input, the display element sets a display state in accordance with the image signal IMG.

Next, in the frame period 312, the display control circuit 101 stops the output of the power supply potential GVp, the start signal GSP, and the clock signal GCK. Specifically, the output of the start signal GSP is stopped first; then, the output of the scan signal SCN in the scan line driver circuit 109 is stopped, so that the selection operation of all the scan lines is terminated. Next, the output of the power supply potential GVp is stopped. Note that "to stop an output" means, for example, to make a wiring to which a signal or a potential is input into a floating state, or to apply a potential at low level to a wiring to which a signal or a potential is input. By the above-described method, malfunction of the scan line driver circuit 109 in stopping operation can be prevented.

Note that in the frame period 312, the case where the pulse of the control signal GDCTL is not input to the display control circuit 101 is illustrated in FIG. 4; however, one embodiment of the present invention is not limited to this structure. In the frame period 312, the pulse of the control signal GDCTL may be input to the display control circuit 101. In this case, the display control circuit 101 is acceptable as long as it is provided with a mechanism for stopping the output of the power supply potential GVp, the start signal GSP, and the clock signal GCK even when the pulse of the control signal GDCTL is input.

Further, in the frame period 312, the display control circuit 101 stops the output of the power supply potential SVp, the start signal SSP, and the clock signal SCK. Specifically, the output of the start signal SSP is stopped first; then, the output of the image signal IMG in the signal line driver circuit 108 is stopped, so that the input operation of the image signal IMG to all the signal lines is terminated. Then, the output of the power supply potential SVp is stopped. By the above-described method, malfunction of the signal line driver circuit 108 in stopping operation can be prevented.

Note that in the frame period 312, the case where the pulse of the control signal SDCTL is not input to the display control circuit 101 is illustrated in FIG. 4; however, one embodiment of the present invention is not limited to this structure. In the frame period 312, the pulse of the control signal SDCTL may be input to the display control circuit 101. In this case, the display control circuit 101 is acceptable as long as it is provided with a mechanism for stopping the output of the power supply potential SVp, the start signal SSP, and the clock signal SCK even when the pulse of the control signal SDCTL is input.

Then, in the frame period 312, the display element included in the pixel holds a display state based on the data of the image signal IMG written to the frame period 311. For example, in the case where a liquid crystal element is used as a display element, a pixel electrode included in the liquid crystal element is in a floating state; therefore, the transmittance set based on the data of the image signal IMG written to the frame period 311 is held in the liquid crystal element. Therefore, in the frame period 312, the pixel portion holds an image based on the data of the image signal IMG written to the frame period 311 as a still image for a certain period. Then, the length of a period for holding the image based on the data of the image signal IMG can be controlled by, for example, pulse intervals of the control signal GDCTL and the control signal SDCTL which are output from the CPU 102.

Next, in a manner similar to that in the frame period 311, the display control circuit 101 starts operation of the signal line driver circuit 108 and the scan line driver circuit 109 in such a manner that the output of the above-described driving signal and power supply potential is started in the frame period 313.

As described in the above example, in the period in which a still image is displayed in the semiconductor display device according to one embodiment of this embodiment, the supply of the start signal, the clock signal, and the power supply potential to the driver circuit can be stopped and display of an image in the pixel portion can be maintained for a certain period. With the above-described structure, power consumption of the semiconductor display device according to one embodiment of this embodiment can be reduced.

Further, in the semiconductor display device according to one embodiment of this embodiment, an interval of writing the image signal IMG to the pixel can be increased; therefore, eye strain caused by the change of images can be reduced.

This embodiment can be implemented in combination with any of the other embodiments, as appropriate.

(Embodiment 3)

In this embodiment, an example of a shift register which can be used in a scan line driver circuit and a signal line driver circuit of the semiconductor display device described in the above embodiment will be described.

Figure 5A:
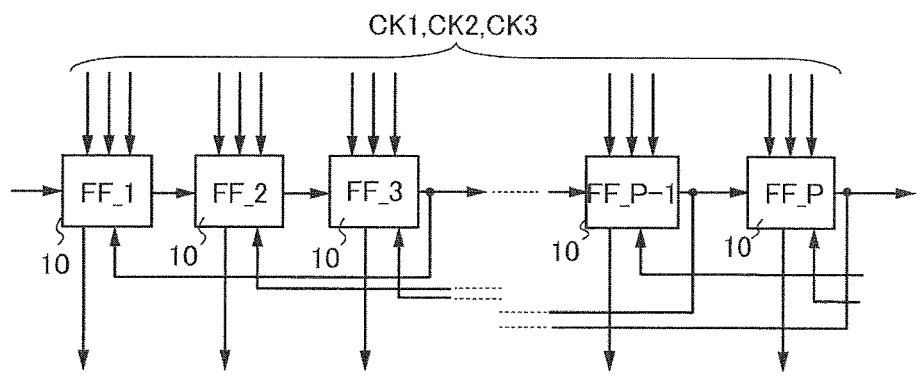
FIGS. 5A and 5B each illustrate a structure of a shift register.
Figure 5B:
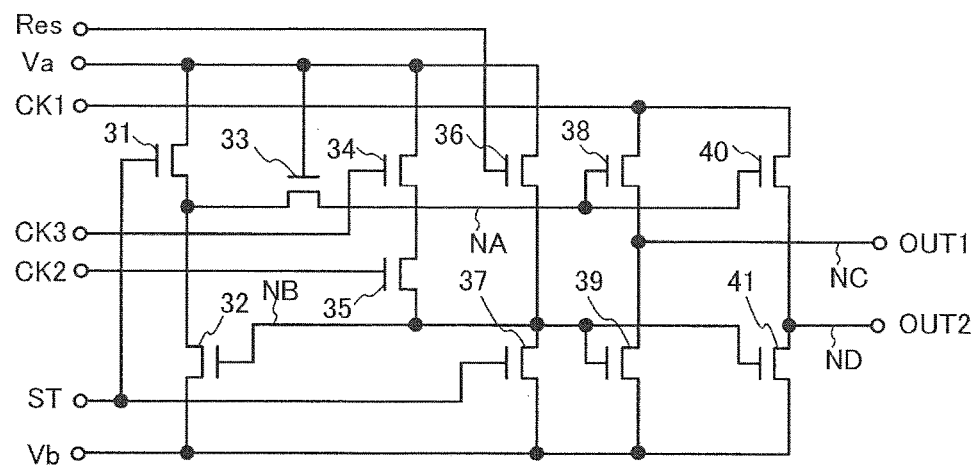

FIGS. 5A and 5B each illustrate an example of the structure of the shift register in this embodiment.

The shift register illustrated in FIG. 5A is formed using P unit sequential circuits 10 (P is a natural number of 3 or more). In FIG. 5A, the P unit sequential circuits 10 are illustrated as unit sequential circuits FF_1 to FF_P.

A start signal ST and a reset signal Res are input to each of the unit sequential circuits FF_1 to FF_P.

Further, a clock signal CK1, a clock signal CK2, and a clock signal CK3 are input to each of the unit sequential circuits FF_1 to FF_P. As the clock signal CK1, the clock signal CK2, and the clock signal CK3, for example, any three of a first clock signal (also referred to as CLK1), a second clock signal (also referred to as CLK2), a third clock signal (also referred to as CLK3), and a fourth clock signal (also referred to as CLK4) can be used. The first to fourth clock signals are digital signals whose potential level is repeatedly switched between high level and low level. Note that the different combinations of the clock signals are input to the adjacent unit sequential circuits 10. The shift register illustrated in FIG. 5A controls operation of the unit sequential circuits 10 with the first to fourth click signals. With the above-described structure, operation speed can be improved.

Further, an example of a specific circuit configuration of the unit sequential circuit 10 illustrated in FIG. 5A is illustrated in FIG. 5B.

The unit sequential circuit illustrated in FIG. 5B includes a transistor 31, a transistor 32, a transistor 33, a transistor 34, a transistor 35, a transistor 36, a transistor 37, a transistor 38, a transistor 39, a transistor 40, and a transistor 41. The case where all the above-described transistors are n-channel transistors is given as an example, and a specific connection relation is described below.

Note that the term "connection" in this specification refers to electrical connection and corresponds to the state in which current, voltage, or a potential can be supplied or transmitted. Accordingly, a connection state means not only a state of a direct connection but also a state of indirect connection through a circuit element such as a wiring, a resistor, a diode, or a transistor so that current, voltage, or a potential can be supplied or transmitted.

Even when a circuit diagram illustrates independent components which are connected to each other, there is the case where one conductive film has functions of a plurality of components such as the case where part of a wiring also functions as an electrode. The term "connection" in this specification includes in its category such a case where one conductive film has functions of a plurality of components.

The names of the "source electrode" and the "drain electrode" included in the transistor interchange with each other depending on the polarity of the transistor or difference between the levels of potentials applied to the respective electrodes. In general, in an n-channel transistor, an electrode to which a lower potential is applied is called a source electrode, and an electrode to which a higher potential is applied is called a drain electrode. Further, in a p-channel transistor, an electrode to which a lower potential is applied is called a drain electrode, and an electrode to which a higher potential is applied is called a source electrode. In this specification, one of a source electrode and a drain electrode is referred to as a first terminal and the other is referred to as a second terminal to describe the connection relation of the transistor.

A power supply potential Va is input to a first terminal of the transistor 31 and a start signal ST is input to a gate electrode of the transistor 31.

A power supply potential Vb is input to a first terminal of the transistor 32 and a second terminal of the transistor 32 is connected to a second terminal of the transistor 31.

Note that either the power supply potential Va or the power supply potential Vb is a high level potential Vdd, and the other is a low level potential Vss. In the case where all the above-described transistors are p-channel transistors, the values of the power supply potential Va and the power supply potential Vb interchange with each other. In addition, a potential difference between the power supply potential Va and the power supply potential Vb corresponds to power supply voltage.

A first terminal of the transistor 33 is connected to the second terminal of the transistor 31 and the power supply potential Va is input to a gate electrode of the transistor 33.

The power supply potential Va is input to a first terminal of the transistor 34 and the clock signal CK3 is input to a gate electrode of the transistor 34.

A first terminal of the transistor 35 is connected to a second terminal of the transistor 34, a second terminal of the transistor 35 is connected to a gate electrode of the transistor 32, and the clock signal CK2 is input to a gate electrode of the transistor 35.

The power supply potential Va is input to a first terminal of the transistor 36 and the reset signal Res is input to a gate electrode of the transistor 36.

The power supply potential Vb is input to a first terminal of the transistor 37, a second terminal of the transistor 37 is connected to the gate electrode of the transistor 32 and a second terminal of the transistor 36, and the start signal ST is input to a gate electrode of the transistor 37.

A signal to be the clock signal CK1 is input to a first terminal of the transistor 38 and a gate electrode of the transistor 38 is connected to a second terminal of the transistor 33.

The power supply potential Vb is input to a first terminal of the transistor 39, a second terminal of the transistor 39 is connected to a second terminal of the transistor 38, and a gate electrode of the transistor 39 is connected to the gate electrode of the transistor 32.

The clock signal CK1 is input to a first terminal of the transistor 40 and a gate electrode of the transistor 40 is connected to the second terminal of the transistor 33.

The power supply potential Vb is input to a first terminal of the transistor 41, a second terminal of the transistor 41 is connected to a second terminal of the transistor 40, and a gate electrode of the transistor 41 is connected to the gate electrode of the transistor 32.

Note that in FIG. 5B, a point at which the second terminal of the transistor 33, the gate electrode of the transistor 38, and the gate electrode of the transistor 40 are connected is a node NA. A point at which the gate electrode of the transistor 32, the second terminal of the transistor 35, the second terminal of the transistor 36, the second terminal of the transistor 37, the gate electrode of the transistor 39, and the gate electrode of the transistor 41 are connected is a node NB. A point at which the second terminal of the transistor 38 and the second terminal of the transistor 39 are connected is a node NC. A point at which the second terminal of the transistor 40 and the second terminal of the transistor 41 are connected is a node ND.

The unit sequential circuit illustrated in FIG. 5B outputs a potential of the node NC as a first output signal OUT1 and outputs a potential of the node ND as a second output signal OUT2. For example, the second output signal OUT2 can be used as a scan signal SCN for selecting a pixel in the scan line driver circuit and can be used as a signal for outputting the image signal IMG to a selected pixel in the signal line driver circuit.

Note that as the start signal ST input to the unit sequential circuit FF_1 of the first stage, for example, the start signal GSP, the start signal STP, or the like in the semiconductor display device of the above-described embodiment is used. Further, in each of the unit sequential circuits FF_2 to FF_P of the second and subsequent stages, the first output signal OUT1 in the unit sequential circuit of each previous stage is used as the start signal ST.

In each of the unit sequential circuits FF_1 to FF_P-2, the first output signal OUT1 in the unit sequential circuit which is two stages after the current stage is used as the reset signal Res. In addition, in each of the unit sequential circuit FF_P-1 and the unit sequential circuit FF_P, a signal which is separately generated can be used as the reset signal Res, for example. Note that the unit sequential circuit FF_P-1 of the (P-1)-th stage and the unit sequential circuit FF_P of the P-th stage are each used as a dummy unit sequential circuit.

Next, the operation of the shift register illustrated in FIG. 5A will be described with reference to FIGS. 6A and 6B.

Figure 6A:
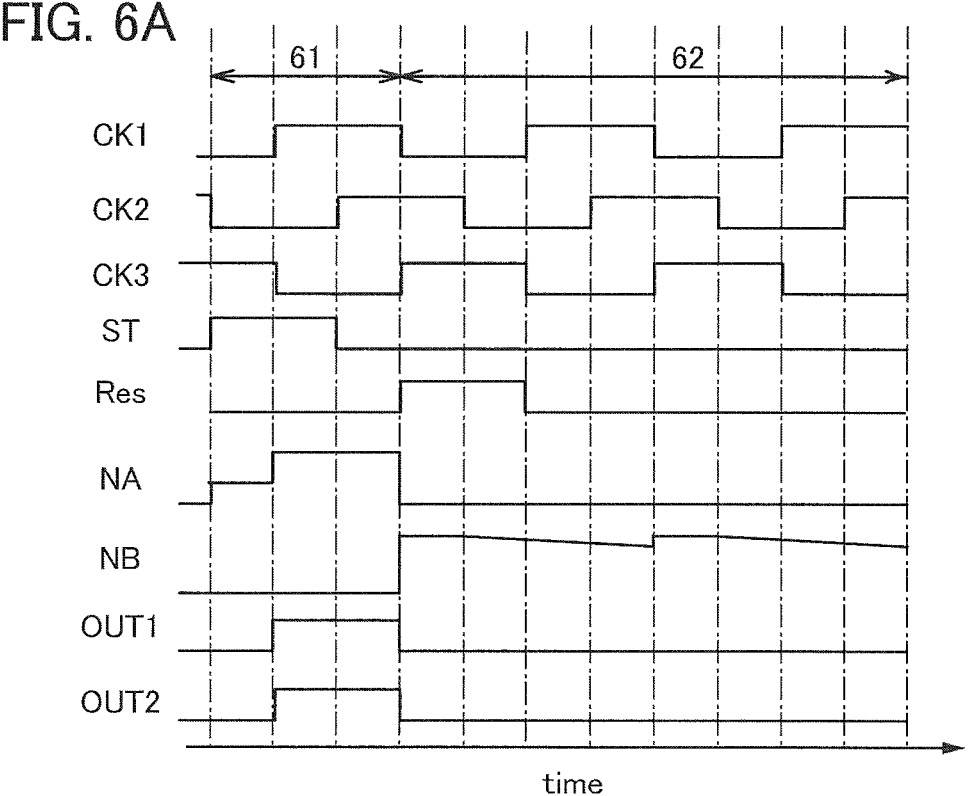
FIGS. 6A and 6B are timing diagrams of operation of a shift register.
Figure 6B:
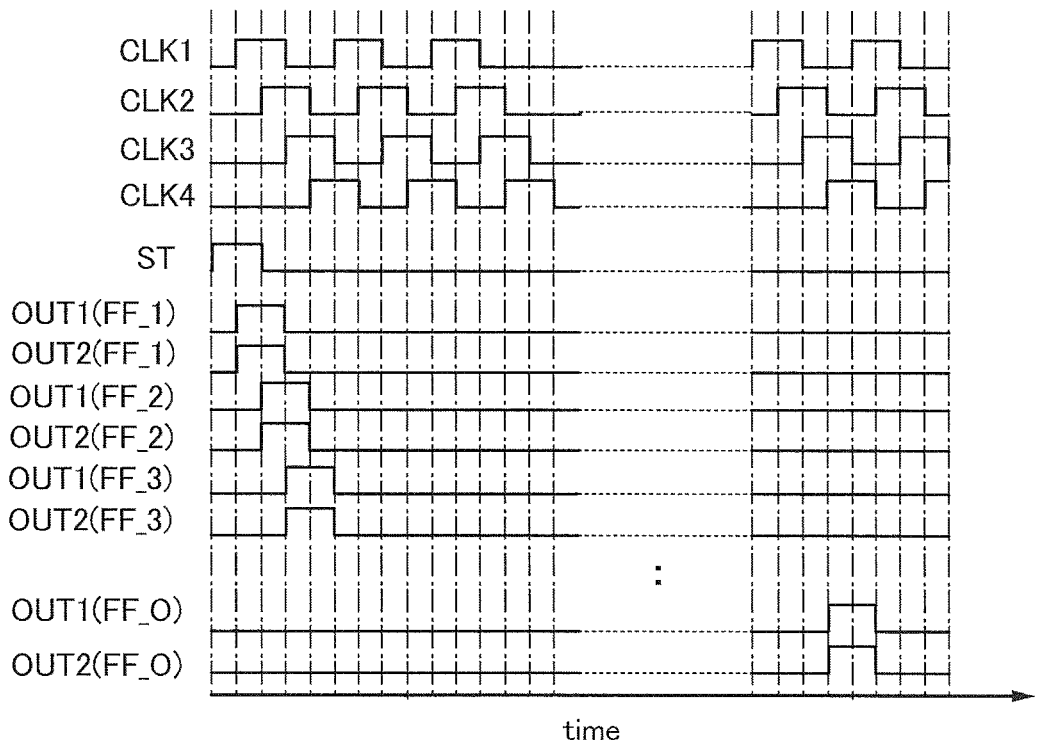

FIG. 6A is a timing diagram illustrating an example of operation of the unit sequential circuit illustrated in FIG. 5B, and FIG. 6B is a timing diagram illustrating an example of operation of the shift register illustrated in FIG. 5A.

Note that FIG. 6A illustrates a timing diagram of the case where the unit sequential circuits 10 illustrated in FIG. 5A each have the structure illustrated in FIG. 5B. In addition, the case where the potential Vdd is input as the power supply potential Va and the potential Vss is input as the power supply potential Vb when all the transistors 31 to 41 in the unit sequential circuit 10 illustrated in FIG. 5B are n-channel transistors is given as an example and description is provided below.

As illustrated in FIG. 6A, when a pulse of the start signal ST is input to each unit sequential circuit 10 in a selection period 61, the transistor 31 is turned on. Accordingly, a potential of the node NA becomes larger than the potential Vdd due to the bootstrap operation, whereby the transistor 38 and the transistor 40 are turned on. In addition, when the transistor 37 is turned on by the input of the pulse of the start signal ST, a potential of the node NB is set to a low level, whereby the transistor 39 and the transistor 41 are turned off. Accordingly, the potential of the first output signal OUT1 is set to a high level, and the potential of the second output signal OUT2 is set to a high level.

Further, when the transistor 36 is turned on by the input of the pulse of the reset signal Res in a non-selection period 62, the potential of the node NB is set to a high level, whereby the transistor 32, the transistor 39, and the transistor 41 are turned on. In addition, when the transistor 32 is turned on, the potential of the node NA is set to a low level, whereby the transistor 38 and the transistor 40 are turned off. Accordingly, the potentials of the first output signal OUT1 and the second output signal OUT2 are maintained at a low level.

The above-described operation is performed sequentially in the unit sequential circuits 10 in accordance with the first clock signal CLK1 to fourth the clock signal CLK4, whereby the first output signal OUT1 and the second output signal OUT2 whose pulses are sequentially shifted can be output from each unit sequential circuit 10, as illustrated in FIG. 6B.

In the case where the shift register described in this embodiment is used for the scan line driver circuit or the signal line driver circuit included in the semiconductor display device of the above embodiment, the supply of the power supply potential input to each unit sequential circuit, of the driving signals such as the clock signal CLK input to each unit sequential circuit, and of the driving signals such as the start signal SP input to the first unit sequential circuit is stopped, whereby the operation of the scan line driver circuit and the signal line driver circuit can be stopped.

This embodiment can be implemented in combination with any of the other embodiments, as appropriate.
(Embodiment 4)

In this embodiment, a liquid crystal display device which is one of the semiconductor display devices of the present invention is given as an example, and a specific structure of a pixel portion will be described.

Figure 7:
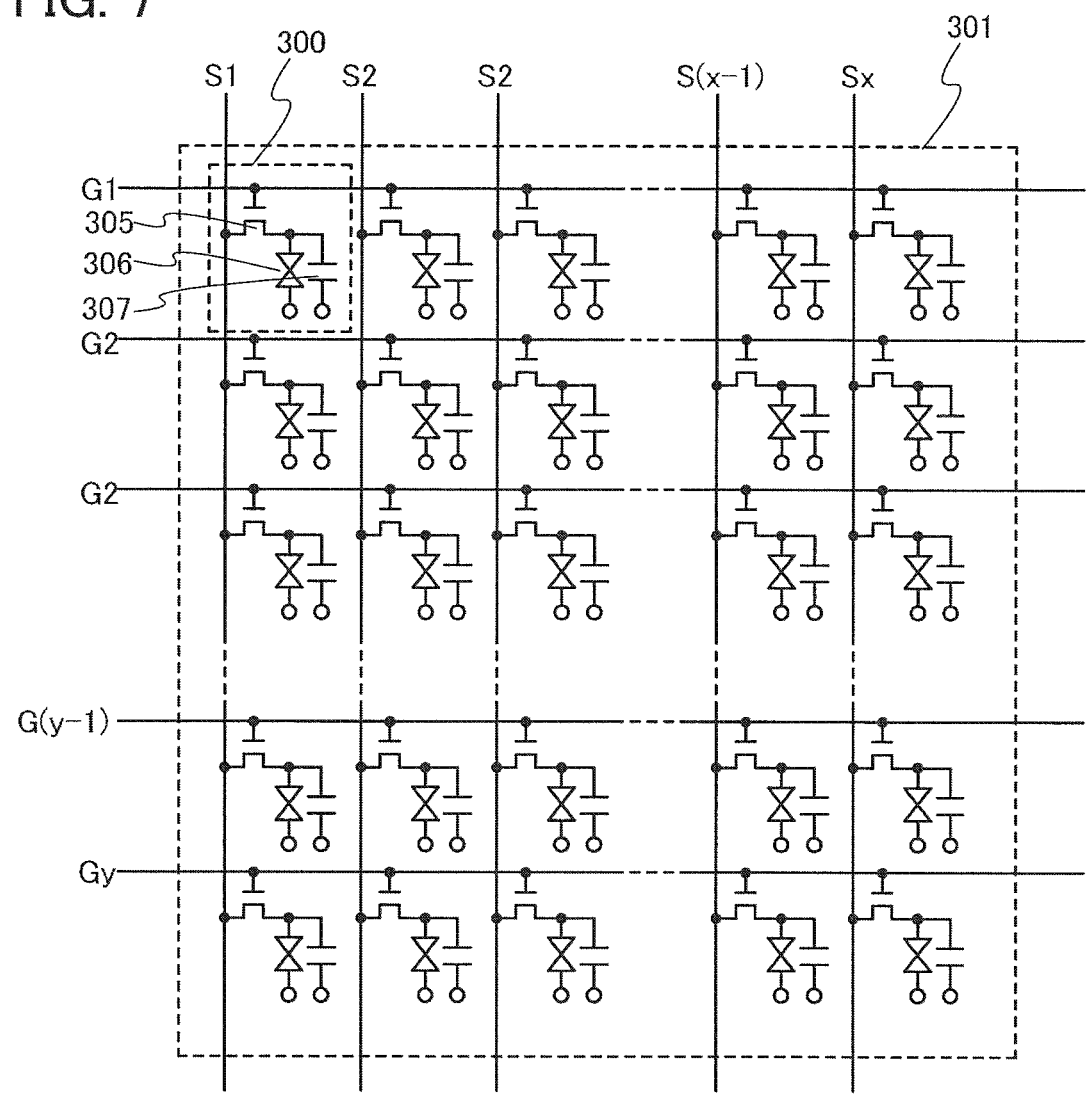
FIG. 7 is a circuit diagram of a structure of a pixel portion.

A structure of a pixel portion 301 provided with a plurality of pixels 300 is illustrated in FIG. 7. In FIG. 7, each of the plurality of pixels 300 includes at least one of signal lines S1 to Sx and at least one of scan lines G1 to Gy. In addition, each pixel 300 includes a transistor 305 which functions as a switching element, a liquid crystal element 306, and a capacitor 307. The liquid crystal element 306 includes a pixel electrode, a counter electrode, and liquid crystals to which voltage between the pixel electrode and the counter electrode is applied.

Each transistor 305 controls whether the potential of the signal line, namely, the potential of the image signal IMG is applied to the pixel electrode of the liquid crystal element 306. A predetermined power supply potential is applied to the counter electrode of the liquid crystal element 306. In addition, the capacitor 307 includes a pair of electrodes; one electrode (first electrode) is connected to the pixel electrode of the liquid crystal element 306, and a predetermined power supply potential is applied to the other electrode (second electrode).

Note that although FIG. 7 illustrates the case where one transistor 305 is used as a switching element in each pixel 300, the present invention is not limited to this structure. A plurality of transistors may be used as one switching element.

Next, operation of the pixel portion 301 illustrated in FIG. 7 will be described.

First, when the scan lines G1 to Gy are sequentially selected, the transistors 305 in the pixels 300 having the selected scan lines are turned on. Then, when a potential of the image signal IMG is applied to the signal lines S1 to Sx, the potential of the image signal IMG is applied to the pixel electrode of the liquid crystal element 306 through the transistors 305 which are on.

The alignment of liquid crystal molecules in the liquid crystal element 306 is changed in accordance with the value of voltage applied between the pixel electrode and the counter electrode, and the transmittance varies. Accordingly, the transmittance of the liquid crystal element 306 is controlled by the potential of the image signal IMG, whereby a gray scale can be displayed.

Next, when the selection of the scan lines is terminated, in the pixels 300 including the scan lines, the transistors 305 are turned off. Then, voltage applied between the pixel electrode and the counter electrode is held in the liquid crystal element 306, whereby display of a gray scale is maintained.

Note that for a liquid crystal display device, so-called AC driving which inverts the polarity of voltage to be applied to the liquid crystal element 306 in a predetermined timing is employed in order to prevent deterioration called burn-in of liquid crystals. Specifically, AC driving can be performed in such a way that the polarity of the potential of the image signal IMG input to each pixel 300 is reversed based on the potential of the counter electrode as a reference. When AC driving is performed, a change of a potential to be applied to the signal line becomes large; therefore, a potential difference between the source electrode and the drain electrode of the transistor 305 functioning as a switching element becomes large. Accordingly, the transistor 305 easily causes deterioration of characteristics such as a shift of threshold voltage. In addition, in order to maintain voltage held in the liquid crystal element 306, low off-state current is required even when the potential difference between the source electrode and the drain electrode is large.

In one embodiment of the present invention, a semiconductor whose band gap is larger than that of silicon or germanium and whose intrinsic carrier density is lower that of silicon or germanium, such as an oxide semiconductor, is used for the transistor 305; therefore, the pressure resistance of the transistor 305 can be increased. Accordingly, the pressure resistance of the transistor 305 is increased, whereby reliability of the liquid crystal display device can be improved.

An oxide semiconductor highly-purified by reduction of impurities such as moisture or hydrogen which serves as an electron donor (donor) (a purified OS) is an i-type semiconductor (an intrinsic semiconductor) or a substantially i-type semiconductor. Therefore, when the above-described oxide semiconductor is used for the transistor 305, the off-state current of the transistor 305 can be dramatically reduced.

The off-state current of the transistor 305 is reduced, so that a change of transmittance due to off-state current can be suppressed even when the number of writing operations of the image signal IMG is reduced in a period in which a still image is displayed, therefore, display of an image can be maintained.

Note that in one embodiment of the present invention, the potential of the counter electrode of the liquid crystal element 306 or the potential of the second electrode of the capacitor 307 may be held using another transistor with extremely low off-state current in a period in which a still image is displayed. With the above-described structure, the power consumption of the semiconductor display device can be further reduced.

This embodiment can be implemented in combination with any of the other embodiments, as appropriate.
(Embodiment 5)

In this embodiment, a structure of a driver circuit included in a semiconductor display device will be described.

Figure 8:
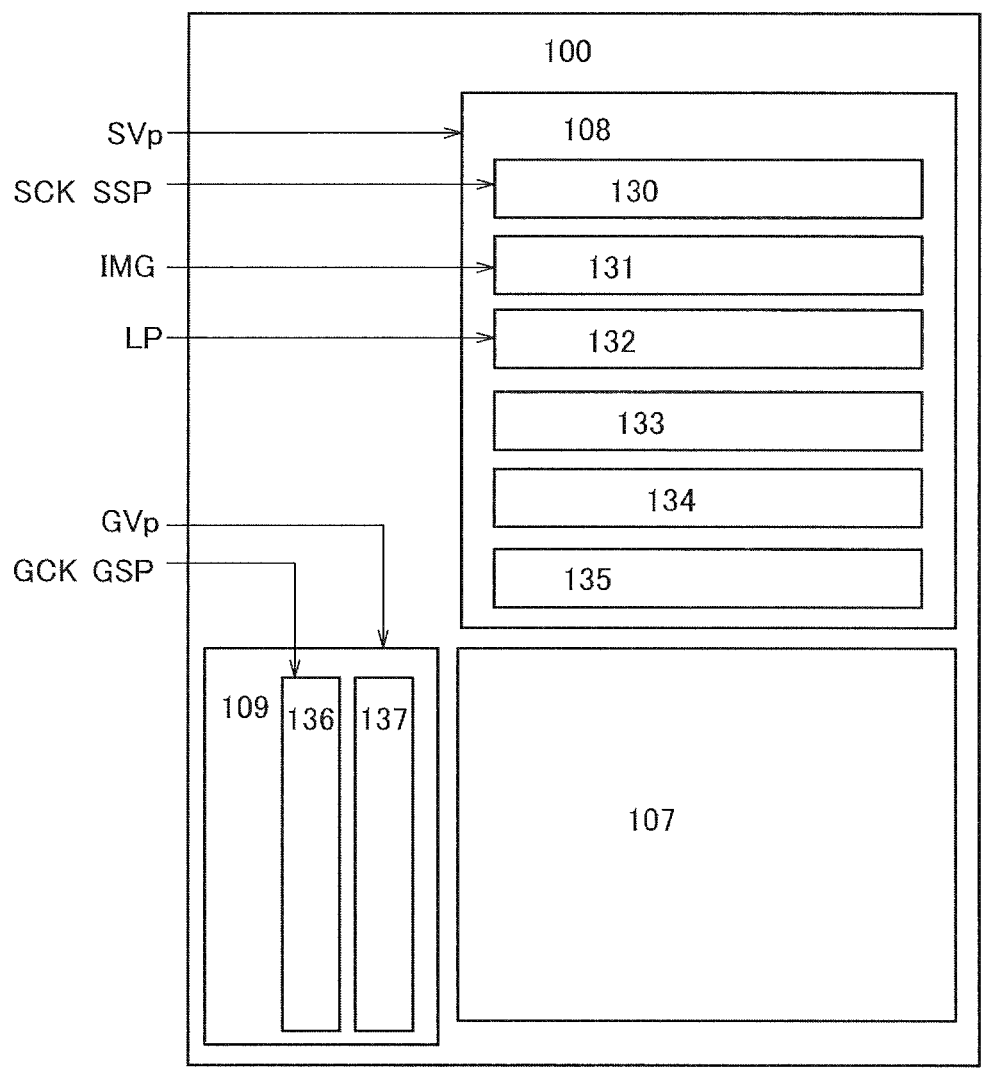
FIG. 8 is a block diagram of a structure of a semiconductor display device.

FIG. 8 is a block diagram illustrating an example of a more detailed structure of the panel 100 included in a semiconductor display device. In the panel 100 illustrated in FIG. 8, the signal line driver circuit 108 includes a shift register 130, a first memory circuit 131, a second memory circuit 132, a level shifter 133, a DAC 134, and an analog buffer 135. In addition, the scan line driver circuit 109 includes a shift register 136 and a digital buffer 137.

Next, the operation of the panel 100 illustrated in FIG. 8 will be described. At the time of the operation of the signal line driver circuit 108, the power supply potential SVp is input to each of the above-described circuits included in the signal line driver circuit 108. In addition, at the time of the operation of the scan line driver circuit 109, the power supply potential GVp is input to each of the above-described circuits included in the scan line driver circuit 109. Note that each of the power supply potential SVp and the power supply potential GVp does not always mean one kind of a power supply potential but also means plural kinds of power supply potentials which have different levels.

When the start signal SSP and the clock signal SCK are input to the shift register 130, the shift register 130 generates a timing signal whose pulse sequentially is shifted.

The image signal IMG is input to the first memory circuit 131. Then, when the timing signal is input to the first memory circuit 131, the image signal IMG is sampled in accordance with a pulse of the timing signal to be sequentially written to a plurality of memory elements included in the first memory circuit 131. That is, the image signal IMG which is input to the signal line driver circuit 108 in series is written to the first memory circuit 131 in parallel. The image signal IMG written to the first memory circuit 131 is held.

Note that the image signals IMG may be sequentially written to a plurality of memory elements included in the first memory circuit 131; or so-called division driving may be performed, in which the memory elements included in the first memory circuit 131 are divided into several groups and the image signals IMG are input to each group in parallel. Note that the number of groups in this case is referred to as the number of divisions. For example, in the case where a memory circuit is divided into groups such that each group has four memory elements, division driving is performed with four divisions.

A latch signal LP is input to the second memory circuit 132. After writing of the image signal IMG to the first memory circuit 131 is completed, the image signal IMG held in the first memory circuit 131 is written to and held in the second memory circuit 132 all at once in accordance with a pulse of the latch signal LP input to the second memory circuit 132 in a retrace period. Again, in accordance with the timing signal from the shift register 130, the next image signals IMG are sequentially written to the first memory circuit 131 in which transmission of the image signal IMG to the second memory circuit 132 is completed. In the one line period of the second round, the image signal IMG which is written to and held in the second memory circuit 132 is transmitted to the DAC 134 after the amplitude of the voltage is adjusted in the level shifter 133. In the DAC 134, the image signal IMG which is input is converted from a digital signal to an analog signal. Then, the image signal IMG which is converted to an analog signal is transmitted to the analog buffer 135. The image signal IMG transmitted from the DAC 134 is transmitted from the analog buffer 135 to the pixel portion 107 through the signal line.

In contrast, in the scan line driver circuit 109, when the start signal GSP and the clock signal GCK are input to the shift register 136, the scan signal SCN whose pulse sequentially is shifted is generated. The scan signal SCN output from the shift register 130 is transmitted from the digital buffer 137 to the pixel portion 107 through the scan line.

The pixel 110 included in the pixel portion 107 is selected by the scan signal SCN input from the scan line driver circuit 109. The image signal IMG transmitted from the signal line driver circuit 108 to the pixel portion 107 through the signal line is input to the above-described selected pixel.

In the panel 100 illustrated in FIG. 8, the start signal SSP, the clock signal SCK, the latch signal LP, and the like correspond to the driving signals of the signal line driver circuit 108. In addition, the start signal GSP, the clock signal GCK, and the like correspond to the driving signals of the scan line driver circuit 109. In a period in which a still image is displayed, the supply of the driving signals and the power supply potential is stopped, whereby the number of writing operations of the image signal IMG to the pixel portion 107 can be reduced, and power consumption of the semiconductor display device can be reduced.

This embodiment can be implemented in combination with any of the other embodiments, as appropriate.

(Embodiment 6)

Next, an example of a method for manufacturing a transistor will be described.

Figure 9A:
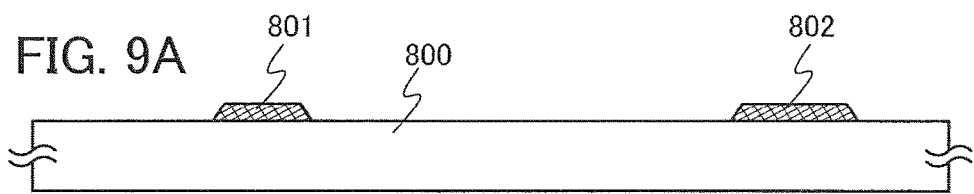
FIGS. 9A to 9D illustrate a method for manufacturing a transistor.

First, as illustrated in FIG. 9A, a gate electrode 801 and an electrode 802 for a capacitor are formed over a substrate 800 having an insulating surface.

The gate electrode 801 and the electrode 802 can be formed with a single layer or a stacked layer using one or more of conductive films using a metal material such as molybdenum, titanium, chromium, tantalum, tungsten, neodymium, or scandium, or an alloy material which includes any of these metal materials as a main component, or nitride of these metals. Note that aluminum or copper can also be used as such a metal material if it can withstand the temperature of heat treatment to be performed in a later process. Aluminum or copper is preferably combined with a refractory metal material so as to prevent a heat resistance problem and a corrosive problem. As the refractory metal material, molybdenum, titanium, chromium, tantalum, tungsten, neodymium, scandium, or the like can be used.

For example, as a two-layer structure of the gate electrode 801 and the electrode 802, the following structures are preferable: a two-layer structure in which a molybdenum film is formed over an aluminum film, a two-layer structure in which a molybdenum film is formed over a copper film, a two-layer structure in which a titanium nitride film or a tantalum nitride film is formed over a copper film, and a two-layer structure in which a titanium nitride film and a molybdenum film are stacked. As a three-layer structure of the gate electrode 801 and the electrode 802, the following structure is preferable: a layered structure in which an aluminum film, an alloy film of aluminum and silicon, an alloy film of aluminum and titanium, or an alloy film of aluminum and neodymium is used as a middle layer and sandwiched between two films selected from a tungsten film, a tungsten nitride film, a titanium nitride film, and a titanium film is used as a top layer and a bottom layer.

Further, a light-transmitting oxide conductive film of indium oxide, an alloy of indium oxide and tin oxide, an alloy of indium oxide and zinc oxide, zinc oxide, zinc aluminum oxide, zinc aluminum oxynitride, zinc gallium oxide, or the like can be used as the gate electrode 801 and the electrode 802.

The thickness of each of the gate electrode 801 and the electrode 802 is 10 nm to 400 nm, preferably 100 nm to 200 nm. In this embodiment, after the conductive film for the gate electrode is formed to have a thickness of 150 nm by a sputtering method using a tungsten target, the conductive film is processed (patterned) into a desired shape by etching, whereby the gate electrode 801 and the electrode 802 are formed. Note that when end portions of the formed gate electrode are tapered, coverage with a gate insulating film formed thereover is improved, which is preferable. Note that a resist mask may be formed by an inkjet method. Formation of the resist mask by an inkjet method needs no photomask; thus, manufacturing cost can be reduced.

Figure 9B:
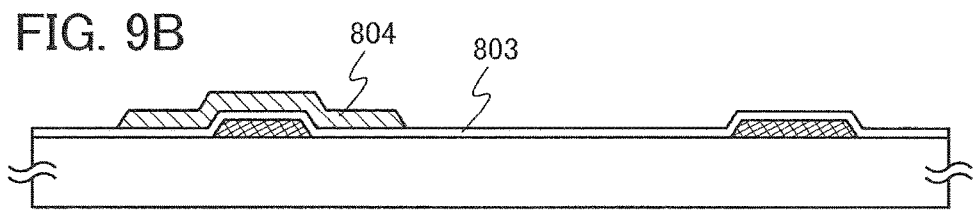

Next, as illustrated in FIG. 9B, a gate insulating film 803 is formed over the gate electrode 801 and the electrode 802. The gate insulating film 803 can be formed to have a single-layer structure or a layered structure of one or more films selected from a silicon oxide film, a silicon nitride film, a silicon oxynitride film, a silicon nitride oxide film, an aluminum oxide film, an aluminum nitride film, an aluminum oxynitride film, an aluminum nitride oxide film, a hafnium oxide film, and a tantalum oxide film by a plasma-enhanced CVD method, a sputtering method, or the like. It is preferable that the gate insulating film 803 includes impurities such as moisture, hydrogen, or oxygen as little as possible. In the case of forming a silicon oxide film by a sputtering method, a silicon target or a quartz target is used as a target, and oxygen or a mixed gas of oxygen and argon is used as a sputtering gas.

The oxide semiconductor which becomes i-type or becomes substantially i-type (a highly-purified oxide semiconductor) due to removal of impurities is extremely sensitive to an interface state or an interface electric charge; therefore, an interface between the highly-purified oxide semiconductor and the gate insulating film 803 is important. Therefore, the gate insulating film (GI) that is in contact with the highly-purified oxide semiconductor needs to have higher quality.

For example, a high-density plasma-enhanced CVD using a microwave (frequency: 2.45 GHz) is preferably used, in which case an insulating film which is dense, has high breakdown voltage, and is of high quality can be formed. The highly-purified oxide semiconductor and the high-quality gate insulating film are in close contact with each other, whereby the interface state can be reduced and interface characteristics can be improved.

Needless to say, a different deposition method such as a sputtering method or a plasma-enhanced CVD method can be used as long as a high-quality insulating film can be formed as a gate insulating film. Moreover, it is possible to form an insulating film whose quality and characteristics of an interface with the oxide semiconductor are improved through heat treatment performed after the formation of the insulating film. In any case, an insulating film that has favorable film quality as the gate insulating film and can reduce interface state density between the gate insulating film and the oxide semiconductor to form a favorable interface is formed.

The gate insulating film 803 may have a structure in which an insulating film formed using a material having a high barrier property and an insulating film having low proportion of nitrogen such as a silicon oxide film or a silicon oxynitride film are stacked. In this case, the insulating film such as a silicon oxide film or a silicon oxynitride film is formed between the insulating film having a high barrier property and the oxide semiconductor film. As the insulating film having a high barrier property, a silicon nitride film, a silicon nitride oxide film, an aluminum nitride film, an aluminum nitride oxide film, and the like can be given, for example. The insulating film having a high barrier property is used, so that impurities in an atmosphere, such as moisture or hydrogen, or impurities included in the substrate, such as an alkali metal or a heavy metal, can be prevented from entering the oxide semiconductor film, the gate insulating film 803, or the interface between the oxide semiconductor film and another insulating film and the vicinity thereof. In addition, the insulating film having lower proportion of nitrogen such as a silicon oxide film or a silicon oxynitride film is formed so as to be in contact with the oxide semiconductor film, so that the insulating film having a high barrier property can be prevented from being in contact with the oxide semiconductor film directly.

For example, a stacked-layer film with a thickness of 100 nm may be formed as the gate insulating film 803 as follows: a silicon nitride film ($SiN_y$ (y >0)) with a thickness of greater than or equal to 50 nm and less than or equal to 200 nm is formed by a sputtering method as a first gate insulating film, and a silicon oxide film ($SiO_x$ (x >0)) with a thickness of greater than or equal to 5 nm and less than or equal to 300 nm is stacked over the first gate insulating film as a second gate insulating film. The thickness of the gate insulating film 803 may be set as appropriate depending on characteristics needed for a transistor and may be approximately 350 nm to 400 nm.

In this embodiment, the gate insulating film 803 is formed to have a structure in which a 100-nm-thick silicon oxide film formed by a sputtering method is formed over a 50-nm-thick silicon nitride film formed by a sputtering method.

Note that in order that the gate insulating film 803 contains as little hydrogen, hydroxyl, and moisture as possible, it is preferable that impurities adsorbed on the substrate 800, such as moisture or hydrogen, be eliminated and removed by preheating the substrate 800, over which the gate electrode 801 and the electrode 802 are formed, in a preheating chamber of a sputtering apparatus, as a pretreatment for film formation. The temperature for the preheating is higher than or equal to 100° C. and lower than or equal to 400° C., preferably, higher than or equal to 150° C. and lower than or equal to 300° C. As an exhaustion unit provided in the preheating chamber, a cryopump is preferable. Note that this preheating treatment can be omitted.

Next, over the gate insulating film 803, an oxide semiconductor film having a thickness of greater than or equal to 2 nm and less than or equal to 200 nm, preferably greater than or equal to 3 nm and less than or equal to 50 nm, more preferably greater than or equal to 3 nm and less than or equal to 20 nm is formed. The oxide semiconductor film is formed by a sputtering method using an oxide semiconductor target. Moreover, the oxide semiconductor film can be formed by a sputtering method under a rare gas (e.g., argon) atmosphere, an oxygen atmosphere, or a mixed atmosphere of a rare gas (e.g., argon) and oxygen.

Note that before the oxide semiconductor film is formed by a sputtering method, dust attached to a surface of the gate insulating film 803 is preferably removed by reverse sputtering in which an argon gas is introduced and plasma is generated. The reverse sputtering refers to a method in which, without application of voltage to a target side, an RF power source is used for application of voltage to a substrate side in an argon atmosphere to modify a surface. Note that instead of an argon atmosphere, a nitrogen atmosphere, a helium atmosphere, or the like may be used. Alternatively, an argon atmosphere to which oxygen, nitrous oxide, or the like is added may be used. Alternatively, an argon atmosphere to which chlorine, carbon tetrafluoride, or the like is added may be used.

As described above, as the oxide semiconductor film, the following oxide semiconductors can also be used: a quaternary metal oxide such as an In—Sn—Ga—Zn—O-based oxide semiconductor; a ternary metal oxide such as an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, and a Sn—Al—Zn—O-based oxide semiconductor; a binary metal oxide such as an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, an In—Ga—O-based oxide semiconductor; an In—O-based oxide semiconductor; a Sn—O-based oxide semiconductor; and a Zn—O-based oxide semiconductor. The above-described oxide semiconductor may include silicon.

Moreover, oxide semiconductors can be represented by the chemical formula, $InMO_3(ZnO)_m$ (m >0). Here, M represents one or more metal elements selected from Ga, Al, Mn, and Co.

In this embodiment, as the oxide semiconductor film, an In—Ga—Zn—O-based non-single-crystal film with a thickness of 30 nm, which is obtained by a sputtering method using a metal oxide target including indium (In), gallium (Ga), and zinc (Zn), is used. As the above-described target, a target having a composition ratio of $In_2O_3:Ga_2O_3:ZnO=1:1:1$ [molar ratio] can be used. Alternatively, a target having a composition ratio of $In_2O_3:Ga_2O_3:ZnO=1:1:2$ [molar ratio] or a target having a composition ratio of $In_2O_3:Ga_2O_3:ZnO=1:1:4$ [molar ratio] can be used, for example. The target may contain $SiO_2$ at greater than or equal to 2 wt % and less than or equal to 10 wt %. The filling factor of the metal oxide target containing In, Ga, and Zn is higher than or equal to 90% and lower than or equal to 100%, and preferably higher than or equal to 95% and lower than or equal to 99.9%. With the use of a metal oxide target with high filling factor, the deposited oxide semiconductor film has high density.

In the case where an In—Zn—O-based material is used as the oxide semiconductor, a target used has a composition ratio of In:Zn=50:1 to 1:2 in an atomic ratio ($In_2O_3$:ZnO=25:1 to 1:4 in a molar ratio), preferably In:Zn=20:1 to 1:1 in an atomic ratio ($In_2O_3$:ZnO=10:1 to 2:1 in a molar ratio), further preferably In:Zn=1.5:1 to 15:1 ($In_2O_3$:ZnO=3:4 to 15:2 in a molar ratio). For example, when a target used for forming the In—Zn—O-based oxide semiconductor has a composition ratio of In:Zn:O=X:Y:Z in an atomic ratio, Z >(1.5X+Y).

In this embodiment, the oxide semiconductor film is formed over the substrate 800 in such a manner that the substrate is held in the treatment chamber kept at reduced pressure, a sputtering gas from which hydrogen and moisture have been removed is introduced into the treatment chamber while moisture remaining therein is removed, and the above-described target is used. The substrate temperature may be higher than or equal to 100° C. and lower than or equal to 600° C., preferably higher than or equal to 200° C. and lower than or equal to 400° C. in film formation. By forming the oxide semiconductor film in a state where the substrate is heated, the concentration of impurities included in the formed oxide semiconductor film can be reduced. In addition, damage by sputtering can be reduced. In order to remove moisture remaining in the treatment chamber, an entrapment vacuum pump is preferably used. For example, a cryopump, an ion pump, or a titanium sublimation pump is preferably used. The evacuation unit may be a turbo pump provided with a cold trap. In the deposition chamber which is evacuated with the cryopump, for example, a hydrogen atom, a compound containing a hydrogen atom, such as water ($H_2O$), (more preferably, also a compound containing a carbon atom), and the like are removed, whereby the concentration of impurities contained in the oxide semiconductor film formed in the deposition chamber can be reduced.

As one example of the deposition condition, the distance between the substrate and the target is 100 mm, the pressure is 0.6 Pa, the direct-current (DC) power source is 0.5 kW, and the atmosphere is an oxygen atmosphere (the proportion of the oxygen flow rate is 100%). Note that a pulsed direct-current (DC) power source is preferable because dust (also referred to as particles) generated in film deposition can be reduced and the film thickness can be uniform.

In order that the oxide semiconductor film contains as little hydrogen, hydroxyl, and moisture as possible, it is preferable that impurities adsorbed on the substrate 800, such as moisture or hydrogen, be eliminated and removed by preheating the substrate 800, on which the process up to and including the step of forming the gate insulating film 803 is already performed, in a preheating chamber of a sputtering apparatus, as a pretreatment for film formation. The temperature for the preheating is higher than or equal to 100° C. and lower than or equal to 400° C., preferably, higher than or equal to 150° C. and lower than or equal to 300° C. As an exhaustion unit provided in the preheating chamber, a cryopump is preferable. Note that this preheating treatment can be omitted. In addition, before an insulating film 808 is formed, the preheating may similarly be performed on the substrate 800 on which the process up to and including the step of forming a source electrode 805, a drain electrode 806, and an electrode 807 for a capacitor is already performed.

Next, as illustrated in FIG. 9B, the oxide semiconductor film is processed (patterned) into a desired shape by etching or the like, whereby an island-shaped oxide semiconductor film 804 is formed over the gate insulating film 803 in a position where the island-shaped oxide semiconductor film 804 overlaps with the gate electrode 801.

A resist mask for forming the island-shaped oxide semiconductor film 804 may be formed by an inkjet method. Formation of the resist mask by an inkjet method needs no photomask; thus, manufacturing cost can be reduced.

Note that etching for forming the island-shaped oxide semiconductor film 804 may be wet etching, dry etching, or both dry etching and wet etching. As the etching gas for dry etching, a gas containing chlorine (chlorine-based gas such as chlorine ($Cl_2$), boron chloride ($BCl_3$), silicon chloride ($SiCl_4$), or carbon tetrachloride ($CCl_4$)) is preferably used. Alternatively, a gas containing fluorine (fluorine-based gas such as carbon tetrafluoride ($CF_4$), sulfur fluoride ($SF_6$), nitrogen fluoride ($NF_3$), or trifluoromethane ($CHF_3$)); hydrogen bromide (HBr); oxygen ($O_2$); any of these gases to which a rare gas such as helium (He) or argon (Ar) is added; or the like can be used.

As the dry etching method, a parallel plate RIE (reactive ion etching) method or an ICP (inductively coupled plasma) etching method can be used. In order to etch the films into desired shapes, the etching condition (the amount of electric power applied to a coil-shaped electrode, the amount of electric power applied to an electrode on a substrate side, the temperature of the electrode on the substrate side, or the like) is adjusted as appropriate.

As an etchant used for wet etching, ITO-07N (produced by KANTO CHEMICAL CO., INC.) may be used. The etchant after the wet etching is removed together with the etched materials by cleaning. The waste liquid including the etchant and the material etched off may be purified and the material may be reused. When a material such as indium included in the oxide semiconductor film is collected from the waste liquid after the etching and reused, the resources can be efficiently used and the cost can be reduced.

Note that it is preferable that reverse sputtering be performed before the formation of a conductive film in a subsequent step so that a resist residue or the like that attaches to surfaces of the island-shaped oxide semiconductor film 804 and the gate insulating film 803 is removed.

Then, heat treatment is performed on the oxide semiconductor film 804 in a nitrogen atmosphere, an oxygen atmosphere, an atmosphere of ultra-dry air, or a rare gas (argon, helium, or the like) atmosphere. It is preferable that the content of water in the gas be 20 ppm or less, preferably 1 ppm or less, and more preferably 10 ppb or less. Heat treatment performed on the oxide semiconductor film 804 can eliminate moisture or hydrogen in the oxide semiconductor film 804. Specifically, heat treatment may be performed at higher than or equal to 300° C. and lower than or equal to 850° C. (or the strain point of the glass substrate), preferably higher than or equal to 550° C. and lower than or equal to 750° C. For example, heat treatment may be performed at 600° C. for a period longer than or equal to 3 minutes and shorter than or equal to 6 minutes. With an RTA method for the heat treatment, dehydration or dehydrogenation can be performed in a short time; therefore, treatment can be performed even at a temperature higher than the strain point of a glass substrate. Alternatively, heat treatment may be performed for approximately one hour in a state where substrate temperature is approximately 450° C.

In this embodiment, the island-shaped oxide semiconductor film 804 is subjected to the heat treatment in a nitrogen atmosphere with the use of an electric furnace which is one example of a heat treatment apparatus.

Note that a heat treatment apparatus is not limited to an electrical furnace, and may include an apparatus for heating an object to be processed by heat conduction or heat radiation from a heating element such as a resistance heating element. For example, an RTA (rapid thermal anneal) apparatus such as a GRTA (gas rapid thermal anneal) apparatus or an LRTA (lamp rapid thermal anneal) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the gas, an inert gas which does not react with an object to be processed by heat treatment, such as nitrogen or a rare gas such as argon is used.

For example, as the heat treatment, GRTA in which the substrate is moved into an inert gas heated at a high temperature of 650° C. to 700° C., heated for several minutes, and moved out of the inert gas heated to the high temperature may be performed. With GRTA, high-temperature heat treatment for a short period of time can be achieved.

Note that it is preferable that in the heat treatment, moisture, hydrogen, or the like be not contained in nitrogen or a rare gas such as helium, neon, or argon. It is preferable that the purity of nitrogen or the rare gas such as helium, neon, or argon which is introduced into a heat treatment apparatus be set to be 6N (99.9999%) or higher, preferably 7N (99.99999%) or higher (that is, the concentration of impurities is 1 ppm or lower, preferably 0.1 ppm or lower).

When impurities such as moisture or hydrogen are added to an oxide semiconductor, in a gate bias-temperature stress test (BT test, the test condition is, for example, at 85° C. with $2\times10^6$ V/cm for 12 hours), a bond between the impurities and a main component of the oxide semiconductor is broken by a high electrical field (B: bias) and high temperature (T: temperature), and dangling bonds generated cause drift of the threshold voltage (Vth). However, as described above, characteristics in an interface between the gate insulating film and the oxide semiconductor film are improved and impurities in the oxide semiconductor film, particularly moisture, hydrogen, and the like are removed as much as possible so that a transistor which withstands a BT test can be obtained.

Through the above-described steps, the concentration of hydrogen in the oxide semiconductor film 804 can be reduced and the oxide semiconductor film can be highly purified. Thus, the oxide semiconductor film can be stabilized. In addition, heat treatment at a temperature of lower than or equal to the glass transition temperature makes it possible to form an oxide semiconductor film with a wide band gap in which carrier density is extremely low. Therefore, a transistor can be manufactured using a large-sized substrate, so that productivity can be increased. In addition, by using the oxide semiconductor film in which the concentration of hydrogen is reduced and purity is improved, it is possible to manufacture a transistor with high breakdown voltage, a reduced short-channel effect, and a high on-off ratio.

Note that when the oxide semiconductor film is heated, a plate-like crystal is formed in the upper surface though it depends on a material of the oxide semiconductor film and heating conditions in some cases. The plate-like crystals are preferably single crystal bodies which are c-axis-aligned in a direction substantially perpendicular to a surface of the oxide semiconductor film. Even if the plate-like crystals are not single crystal bodies, each crystal is preferably a polycrystalline body which is c-axis-aligned in a direction substantially perpendicular to the surface of the oxide semiconductor film. Further, it is preferable that the polycrystalline bodies be c-axis-aligned and that the a-b planes of crystals correspond, or the a-axis or the b-axis of the crystals be aligned with each other. Note that when a base surface of the oxide semiconductor film is uneven, a plate-like crystal is a polycrystal. Therefore, the base surface is preferably as even as possible.

Figure 9C:
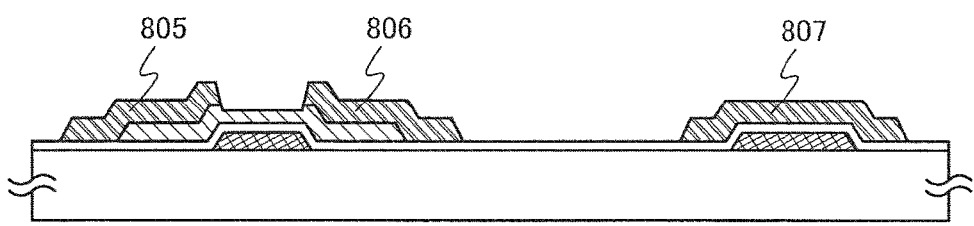

Then, a conductive film used for the source electrode or the drain electrode (including a wiring formed in the same layer as the source electrode or the drain electrode) is formed over the oxide semiconductor film 804 by a sputtering method or a vacuum evaporation method; then, the conductive film is patterned by etching or the like, whereby as illustrated in FIG. 9C, the source electrode 805 and the drain electrode 806 are formed over the oxide semiconductor film 804, and the electrode 807 which overlaps with the electrode 802 with the gate insulating film 803 interposed therebetween.

As the material of the conductive film to be the source electrode 805, the drain electrode 806, and the electrode 807 (including a wiring formed in the same layer as the source electrode 805, the drain electrode 806, and the electrode

807), there are an element selected from Al, Cr, Cu, Ta, Ti, Mo, and W; an alloy including any of the above elements as a component; an alloy including any of these elements in combination; and the like. In addition, a structure in which a film of a refractory metal such as Cr, Ta, Ti, Mo, or W is formed on a lower side or an upper side of a metal film of Al, Cu, or the like may be used. Furthermore, an Al material to which an element which prevents generation of hillocks or whisker in an Al film, such as Si, Ti, Ta, W, Mo, Cr, Nd, Sc, or Y is added may be used, leading to improvement in heat resistance.

Further, the conductive film may have a single-layer structure or a layered structure of two or more layers. For example, a single-layer structure of an aluminum film including silicon, a two-layer structure in which a titanium film is formed over an aluminum film, a three-layer structure in which a titanium film, an aluminum film, and a titanium film are stacked in that order, and the like can be given.

Alternatively, the conductive film to be the source electrode 805, the drain electrode 806, and the electrode 807 (including a wiring formed in the same layer as the source electrode 805, the drain electrode 806, and the electrode 807) may be formed using a conductive metal oxide. As a conductive metal oxide, indium oxide ($In_2O_3$), tin oxide ($SnO_2$), zinc oxide (ZnO), an alloy of indium oxide and tin oxide ($In_2O_3$—$SnO_2$, abbreviated to ITO), an alloy of indium oxide and zinc oxide ($In_2O_3$—ZnO), or the metal oxide material to which silicon or silicon oxide is added can be used.

In the case where heat treatment is performed after formation of the conductive film, the conductive film preferably has heat resistance enough to withstand the heat treatment.

Note that each material and etching conditions are adjusted as appropriate so that the oxide semiconductor film 804 is not removed in etching of the conductive film as much as possible. Depending on etching conditions, an exposed portion of the island-shaped oxide semiconductor film 804 may be partly etched, so that a groove (a recessed portion) is formed in some cases.

In order to reduce the number of photomasks and steps in a photolithography step, etching may be performed with the use of a resist mask formed using a multi-tone mask through which light is transmitted so as to have a plurality of intensities. A resist mask formed with the use of a multi-tone mask has a plurality of thicknesses and further can be changed in shape by etching; therefore, the resist mask can be used in a plurality of etching steps for processing into different patterns. Therefore, a resist mask corresponding to at least two kinds or more of different patterns can be formed by one multi-tone mask. Thus, the number of light-exposure masks can be reduced and the number of corresponding photolithography steps can be also reduced, whereby simplification of a process can be achieved.

Next, plasma treatment is performed thereon, using a gas such as $N_2O$, $N_2$, or Ar. By the plasma treatment, water or the like which attaches or is adsorbed to an exposed surface of the oxide semiconductor film is removed. Plasma treatment may be performed using a mixed gas of oxygen and argon as well.

Figure 9D:
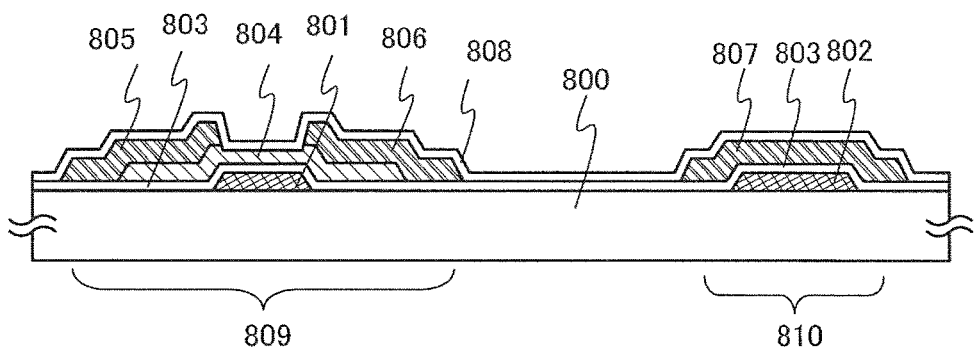

After the plasma treatment, as illustrated in FIG. 9D, the insulating film 808 is formed so as to cover the source electrode 805, the drain electrode 806, the electrode 807, and the oxide semiconductor film 804. The insulating film 808 preferably contains impurities such as moisture or hydrogen as little as possible, and may be formed using a single-layer insulating film or a plurality of insulating films stacked.

When hydrogen is contained in the insulating film 808, entry of the hydrogen to the oxide semiconductor film or extraction of oxygen in the oxide semiconductor film by the hydrogen occurs, whereby a back channel portion of the oxide semiconductor film has lower resistance (n-type conductivity); thus, a parasitic channel might be formed. Therefore, it is preferable that a formation method in which hydrogen is not used is employed in order to form the insulating film 808 containing as little hydrogen as possible. A material having a high barrier property is preferably used for the insulating film 808. For example, as the insulating film having a high barrier property, a silicon nitride film, a silicon nitride oxide film, an aluminum nitride film, an aluminum nitride oxide film, or the like can be used. When a plurality of insulating films stacked is used, an insulating film having a lower proportion of nitrogen such as a silicon oxide film or a silicon oxynitride film is formed on the side closer to the oxide semiconductor film 804 than the insulating film having a high barrier property. Then, the insulating film having a high barrier property is formed so as to overlap with the source electrode 805, the drain electrode 806, and the oxide semiconductor film 804 with the insulating film having lower proportion of nitrogen between the insulating film having a barrier property and the source electrode 805, the drain electrode 806, and the oxide semiconductor film 804. By using the insulating film having a high barrier property, the impurities such as moisture or hydrogen can be prevented from entering the oxide semiconductor film 804, the gate insulating film 803, or the interface between the oxide semiconductor film 804 and another insulating film and the vicinity thereof. In addition, the insulating film having lower proportion of nitrogen such as a silicon oxide film or a silicon oxynitride film is formed so as to be in contact with the oxide semiconductor film 804, so that the insulating film formed using a material having a high barrier property can be prevented from being in contact with the oxide semiconductor film 804 directly.

In this embodiment, the insulating film 808 having a structure in which a silicon nitride film having a thickness of 100 nm formed by a sputtering method is formed over a silicon oxide film having a thickness of 200 nm formed by a sputtering method is formed. The substrate temperature in film formation may be higher than or equal to room temperature and lower than or equal to 300° C. and in this embodiment, is 100° C.

Note that after the insulating film 808 is formed, heat treatment may be performed. The heat treatment is performed in an atmosphere of nitrogen, oxygen, ultra-dry air, or a rare gas (argon, helium, or the like) preferably at a temperature higher than or equal to 200° C. and lower than or equal to 400° C., for example, higher than or equal to 250° C. and lower than or equal to 350° C. It is preferable that the content of water in the gas be 20 ppm or less, preferably 1 ppm or less, and more preferably 10 ppb or less. In this embodiment, for example, heat treatment at 250° C. in a nitrogen atmosphere for one hour is performed. Alternatively, RTA treatment for a short time at a high temperature may be performed before the formation of the source electrode 805, the drain electrode 806, and the electrode 807 in a manner similar to the heat treatment performed on the oxide semiconductor film. Even when oxygen deficiency occurs in the oxide semiconductor film 804 due to the heat treatment performed on the oxide semiconductor film, the insulating film 808 containing oxygen is provided in contact with an exposed region of the oxide semiconductor film 804 provided between the source electrode 805 and the drain electrode 806, and then heat treatment is performed, whereby oxygen is supplied to the oxide semiconductor film 804. Therefore, when oxygen is supplied to the region of the oxide semiconductor film 804 which is in contact with the insulating film 808, oxygen deficiency serving as a donor can be reduced and the stoichiometric composition ratio can be satisfied. As a result, the oxide semiconductor film 804 can be made to be an i-type semiconductor film or a substantially i-type semiconductor film. Accordingly, electrical characteristics of the transistor can be improved and variation in the electrical characteristics thereof can be reduced. The timing of this heat treatment is not particularly limited as long as it is after the formation of the insulating film 808, and this heat treatment can be performed without increasing the number of manufacturing steps by doubling as another step such as heat treatment for formation of a resin film or heat treatment for reduction of the resistance of a transparent conductive film, so that the oxide semiconductor film 804 can be made to be an i-type semiconductor film or a substantially i-type semiconductor film.

Next, after a conductive film is formed over the insulating film 808, the conductive film is patterned, so that a back gate electrode may be formed so as to overlap with the oxide semiconductor film 804. When the back gate electrode is formed, an insulating film is formed so as to cover the back gate electrode. The back gate electrode can be formed using a material and a structure similar to those of the gate electrode 801, the electrode 802, the source electrode 805 and the drain electrode 806, or the electrode 807.

The thickness of the back gate electrode is set to be 10 nm to 400 nm, preferably 100 nm to 200 nm. In this embodiment, the back gate electrode may be formed in a such a manner that a conductive film in which a titanium film, an aluminum film, and a titanium film are stacked is formed, a resist mask is formed by a photolithography method or the like, and unnecessary portions are removed by etching so that the conductive film is processed (patterned) into a desired shape.

The insulating film is preferably formed using a material having a high barrier property which can prevent moisture, hydrogen, and the like in an atmosphere from influencing characteristics of the transistor. For example, the insulating film can be formed to have a single-layer structure or a layered structure of a silicon nitride film, a silicon nitride oxide film, an aluminum nitride film, an aluminum nitride oxide film, or the like, as an insulating film having a high barrier property, by a plasma-enhanced CVD method, a sputtering method, or the like. In order to obtain an effect of a barrier property, the insulating film is preferably formed to a thickness of 15 nm to 400 nm, for example.

In this embodiment, an insulating film is formed to a thickness of 300 nm by a plasma-enhanced CVD method. The insulating film is formed under the following conditions: the flow rate of a silane gas is 4 sccm; the flow rate of dinitrogen monoxide ($N_2O$) is 800 sccm; and the substrate temperature is 400° C.

With the above steps, a transistor 809 and a capacitor 810 are formed. Note that the capacitor 810 is formed in a region where the electrode 802 overlaps with the electrode 807 with the gate insulating film 803 interposed therebetween.

The transistor 809 includes the gate electrode 801, the gate insulating film 803 over the gate electrode 801, the oxide semiconductor film 804 which is over the gate insulating film 803 and overlaps with the gate electrode 801, and the source electrode 805 and the drain electrode 806 which are a pair and formed over the oxide semiconductor film 804. The transistor 809 may further include the insulating film 808 provided over the oxide semiconductor film 804 as a component. The transistor 809 illustrated in FIG. 9D has a channel-etched structure in which the oxide semiconductor film 804 is partly etched between the source electrode 805 and the drain electrode 806.

Although the transistor 809 is described as a single-gate transistor, a multi-gate transistor including a plurality of channel formation regions can be manufactured when a plurality of the gate electrodes 801 which is electrically connected is included if needed.

Note that the band gap of the oxide semiconductor is 3.0 eV to 3.5 eV. The band gap of silicon carbide and the band gap of gallium nitride are 3.26 eV and 3.39 eV, respectively, which are approximately three times as large as that of silicon. Therefore, these compound semiconductors such as silicon carbide and gallium nitride are similar to the oxide semiconductor in that they are both wide band gap semiconductors. The characteristics of the wide band gap are advantageous for improving the breakdown voltage of a signal processing circuit, reducing loss of electric power, and the like.

However, compound semiconductors such as silicon carbide and gallium nitride are required to be single crystal, and it is difficult to meet the manufacturing condition to obtain a single crystal material; for example, crystal growth at a temperature extremely higher than a process temperature of the oxide semiconductor is needed or epitaxial growth over a special substrate is needed. Such a condition does not allow film formation of any of these compound semiconductors over a silicon wafer that can be obtained easily or a glass substrate whose allowable temperature limit is low.

Therefore, an inexpensive substrate cannot be used, and further, the substrate cannot be increased in size, so that the productivity of signal processing circuits using the compound semiconductor such as silicon carbide or gallium nitride is low. In contrast, since the oxide semiconductor can be deposited even at a room temperature, the oxide semiconductor can be deposited over a glass substrate, which leads to high productivity.

This embodiment can be implemented in combination with any of the other embodiments, as appropriate.

(Embodiment 7)

In this embodiment, a structure of a transistor which is different from that of a transistor formed in accordance with Embodiment 6 will be described.

Figure 10A:
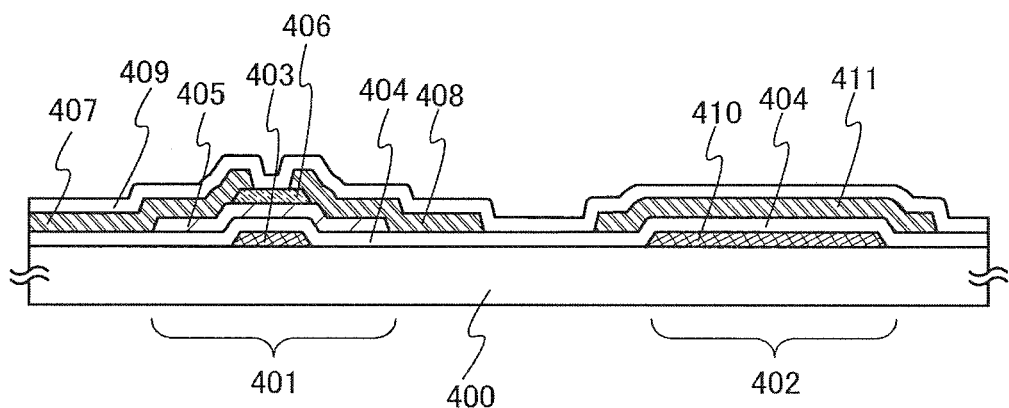
FIGS. 10A to 10C each illustrate a structure of a transistor.

In FIG. 10A, an example in which a transistor 401 and a capacitor 402 are formed over a substrate 400 is illustrated.

The transistor 401 includes, over the substrate 400 having an insulating surface, a gate electrode 403; an insulating film 404 over the gate electrode 403; an oxide semiconductor film 405 which overlaps with the gate electrode 403 with the insulating film 404 provided therebetween and functions as an active layer; a channel protective film 406 over the oxide semiconductor film 405; and a source electrode 407 and a drain electrode 408 which are over the oxide semiconductor film 405. An insulating film 409 is formed over the oxide semiconductor film 405, the channel protective film 406, the source electrode 407, and the drain electrode 408, and the transistor 401 may include the insulating film 409 as a component.

In addition, the capacitor 402 includes an electrode 410, the insulating film 404 over the electrode 410, and an electrode 411 over the insulating film 404.

The channel protective film 406 can be formed by a vapor deposition method such as a plasma-enhanced CVD method or a thermal CVD method, or a sputtering method. In addition, the channel protective film 406 is preferably formed using an inorganic material including oxygen (such as silicon oxide, silicon oxynitride, or silicon nitride oxide). An inorganic material containing oxygen is used for the channel protective film 406, whereby a structure can be provided, in which oxygen is supplied to a region of the oxide semiconductor film 405 in contact with at least the channel protective film 406 and oxygen deficiency serving as a donor is reduced to satisfy the stoichiometric composition ratio even when the oxygen deficiency occurs in the oxide semiconductor film 405 by heat treatment for reducing moisture or hydrogen. Accordingly, the channel formation region can be made to be an i-type channel formation region or a substantially i-type channel formation region, variation in electrical characteristics of the transistor 401 due to oxygen deficiency can be reduced, and electrical characteristics can be improved.

Note that a channel formation region corresponds to a region of a semiconductor film, which overlaps with a gate electrode with a gate insulating film provided between the semiconductor film and the gate electrode.

The transistor 401 may further include a back gate electrode over the insulating film 409. The back gate electrode is formed so as to overlap with a channel formation region in the oxide semiconductor film 405. The back gate electrode may be electrically insulated and in a floating state, or may be in a state where the back gate electrode is supplied with a potential. In the case of the latter, the back gate electrode may be supplied with the same potential as the gate electrode 403, or may be supplied with a fixed potential such as a ground potential. The level of the potential supplied to the back gate electrode may be controlled so as to control the threshold voltage of the transistor 401.

Figure 10B:
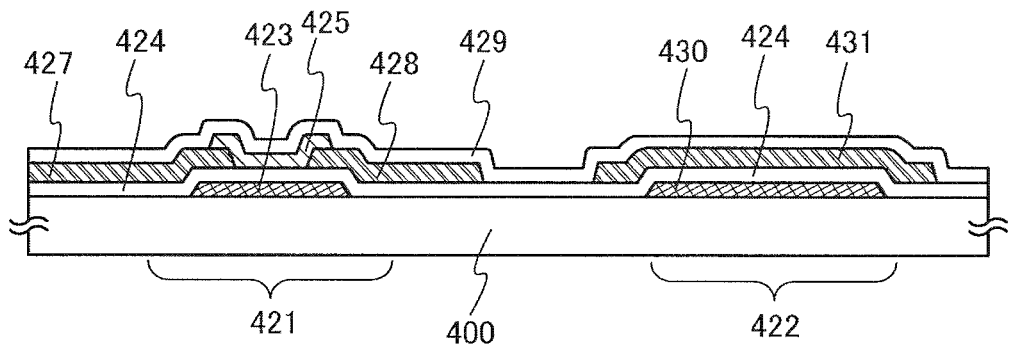

In addition, an example in which a transistor 421 and a capacitor 422 are formed over the substrate 400, which is different from that in FIG. 10A, is illustrated in FIG. 10B.

The transistor 421 includes a gate electrode 423 over the substrate 400 having an insulating surface, an insulating film 424 over the gate electrode 423, a source electrode 427 and a drain electrode 428 which are over the insulating film 424, and an oxide semiconductor film 425 which overlaps with the gate electrode 423 with the insulating film 424 interposed therebetween, which is in contact with the source electrode 427 and the drain electrode 428, and which serves as an active layer. An insulating film 429 is formed over the oxide semiconductor film 425, the source electrode 427, and the drain electrode 428, and the transistor 421 may include the insulating film 429 as a component.

In addition, the capacitor 422 includes an electrode 430, the insulating film 424 over the electrode 430, and an electrode 431 over the insulating film 424.

The transistor 421 may further include a back gate electrode over the insulating film 429. The back gate electrode is formed so as to overlap with the channel formation region in the oxide semiconductor film 425. The back gate electrode may be electrically insulated and in a floating state, or may be in a state where the back gate electrode is supplied with a potential. In the latter case, the back gate electrode may be supplied with the potential having the same level as the gate electrode 423, or may be supplied with a fixed potential such as a ground potential. By controlling the potential supplied to the back gate electrode, it is possible to control the threshold voltage of the transistor 421.

Figure 10C:
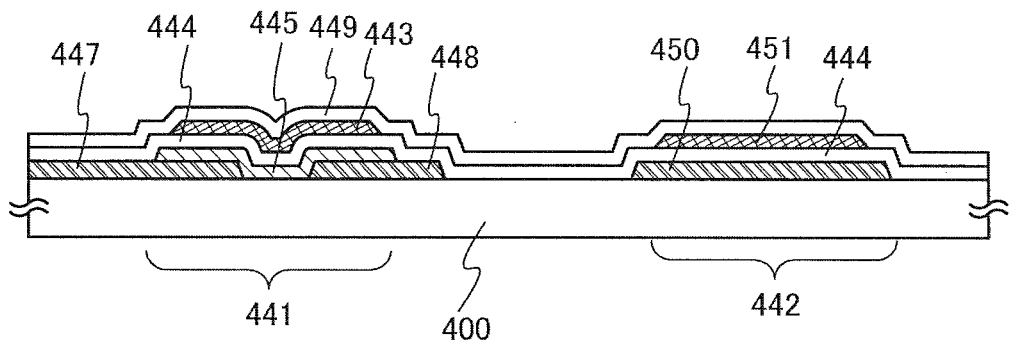

In addition, an example in which a transistor 441 and a capacitor 442 are formed over the substrate 400, which is different from that in FIG. 10A and that in FIG. 10B, is illustrated in FIG. 10C.

The transistor 441 includes a source electrode 447 and a drain electrode 448 over the substrate 400 having an insulating surface, an oxide semiconductor film 445 serving as active layer over the source electrode 447 and the drain electrode 448, an insulating film 444 over the oxide semiconductor film 445, and a gate electrode 443 which overlaps with the oxide semiconductor film 445 with the insulating film 444 interposed therebetween. An insulating film 449 is formed over the gate electrode 443, and the transistor 441 may include the insulating film 449 as a component.

In addition, the capacitor 442 includes an electrode 450, the insulating film 444 over the electrode 450, and an electrode 451 over the insulating film 444.

Note that it is found that the oxide semiconductor film formed by sputtering or the like includes large amount of impurities such as moisture or hydrogen. Moisture and hydrogen easily form a donor level and thus serve as impurities in the oxide semiconductor. Thus, heat treatment is performed on the oxide semiconductor film in an atmosphere of nitrogen, oxygen, ultra-dry air, or a rare gas (argon, helium, or the like) in order to highly purify the oxide semiconductor film by reducing impurities such as moisture or hydrogen in the oxide semiconductor film. It is desirable that the content of water in the gas be 20 ppm or less, preferably 1 ppm or less, and more preferably 10 ppb or less. The above heat treatment is preferably performed at higher than or equal to 500° C. and lower than or equal to 850° C. (alternatively, a strain point of a glass substrate or less), more preferably higher than or equal to 550° C. and lower than or equal to 750° C. Note that this heat treatment is performed at a temperature not exceeding the allowable temperature limit of the substrate to be used. An effect of elimination of moisture or hydrogen by the heat treatment has been confirmed by thermal desorption spectrometry (TDS).

Note that in a semiconductor display device according to one embodiment of the present invention, a transistor whose channel formation region includes an oxide semiconductor is used in a pixel portion, and a driver circuit may be fabricated using the above-described transistor. In this case, the pixel portion and the driver circuit can be formed over one substrate.

Alternatively, part or all of a driver circuit may be formed using a polycrystalline semiconductor or single crystal semiconductor which has higher mobility than an oxide semiconductor, and may be mounted on a substrate formed in a pixel portion. For example, the transistor formed using a crystalline semiconductor such as a polycrystalline or single crystal semiconductor including silicon, germanium, or the like whose mobility is higher than that of an oxide semiconductor can be formed using a silicon wafer, an SOI (silicon on insulator) substrate, a polycrystalline semiconductor film over an insulating surface, or the like.

An SOI substrate can be manufactured using, for example, UNIBOND (registered trademark) typified by Smart Cut (registered trademark), epitaxial layer transfer (ELTRAN) (registered trademark), a dielectric separation method, a plasma assisted chemical etching (PACE) method, a separation by implanted oxygen (SIMOX) method, or the like.

A semiconductor film of silicon formed over a substrate having an insulating surface may be crystallized by a known technique. As the known technique of crystallization, a laser crystallization method using a laser beam and a crystallization method using a catalytic element are given. Alternatively, a crystallization method using a catalytic element and a laser crystallization method may be combined. In the case of using a thermally stable substrate having high heat resistance such as quartz, it is possible to combine any of the following crystallization methods: a thermal crystallization method with an electrically-heated oven, a lamp annealing crystallization method with infrared light, a crystallization method with a catalytic element, and a high temperature annealing method at approximately 950° C.

This embodiment can be implemented in combination with any of the other embodiments, as appropriate.

(Embodiment 8)

A semiconductor display device according to one embodiment of the present invention includes a position input device which is referred to as a touch panel.

The touch panel can detect a position which is indicated with a finger or a stylus in a position detection portion and generate a signal including the positional information. Thus, a touch panel is provided so that the position detection portion overlaps with a pixel portion of a panel, whereby which position of the pixel portion is indicated by a user of the semiconductor display device can be obtained as information.

Figure 11:
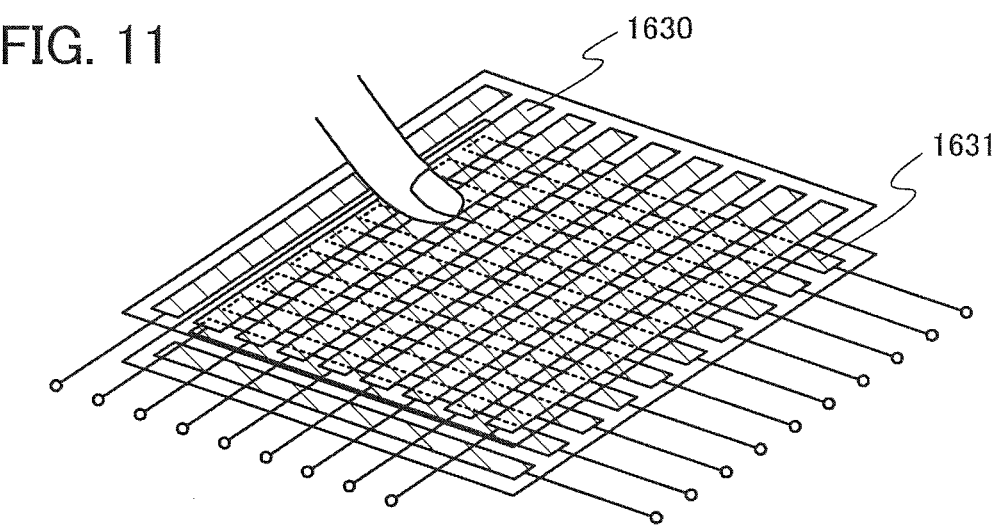
FIG. 11 illustrates a structure of a touch panel.

The position in the position detection portion can be detected by any of various systems such as a resistive system, a capacitance system, an ultrasonic system, an optics system including an infrared ray system, and an electromagnetic induction system. FIG. 11 is a perspective view of a position detection portion using a resistive system. As the position detection portion of the resistive system, a plurality of first electrodes 1630 and a plurality of second electrodes 1631 are provided so that the plurality of first electrodes 1630 is opposed to the plurality of second electrodes 1631 with an interval. When pressing force is applied to any of the plurality of first electrodes 1630 with a finger or the like, the first electrode 1630 is in contact with any of the plurality of second electrodes 1631. Then, when a value of voltage applied to both ends of each of the plurality of the first electrodes 1630 and a value of voltage applied to both ends of each the plurality of the second electrodes 1631 are monitored, it is possible to specify the first electrode 1630 and the second electrode 1631 which are in contact with each other, whereby a position where the finger touches can be detected.

The first electrode 1630 and the second electrode 1631 can be formed using a transparent conductive material such as indium tin oxide including silicon oxide (ITSO), indium tin oxide (ITO), zinc oxide (ZnO), indium zinc oxide (IZO), or gallium-doped zinc oxide (GZO), for example.

Figure 12A:
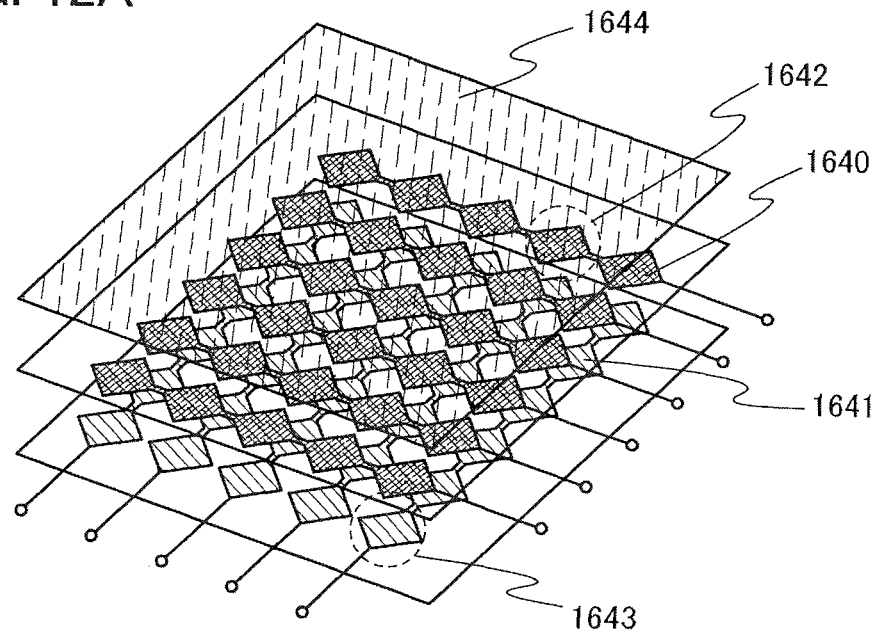
FIGS. 12A and 12B each illustrate a structure of a touch panel.

In addition, a perspective view of the position detection portion using a projected capacitive system among capacitance systems is illustrated in FIG. 12A. As the position detection portion of the projected capacitive system, a plurality of first electrodes 1640 and a plurality of second electrodes 1641 are provided so that the first electrodes 1640 overlap with the second electrodes 1641. Each of the first electrodes 1640 has a structure in which a plurality of rectangular conductive films 1642 is connected to each other, and each of the second electrodes 1641 has a structure in which a plurality of rectangular conductive films 1643 is connected to each other. Note that the shapes of the first electrodes 1640 and the second electrodes 1641 are not limited to these structures.

Figure 12B:
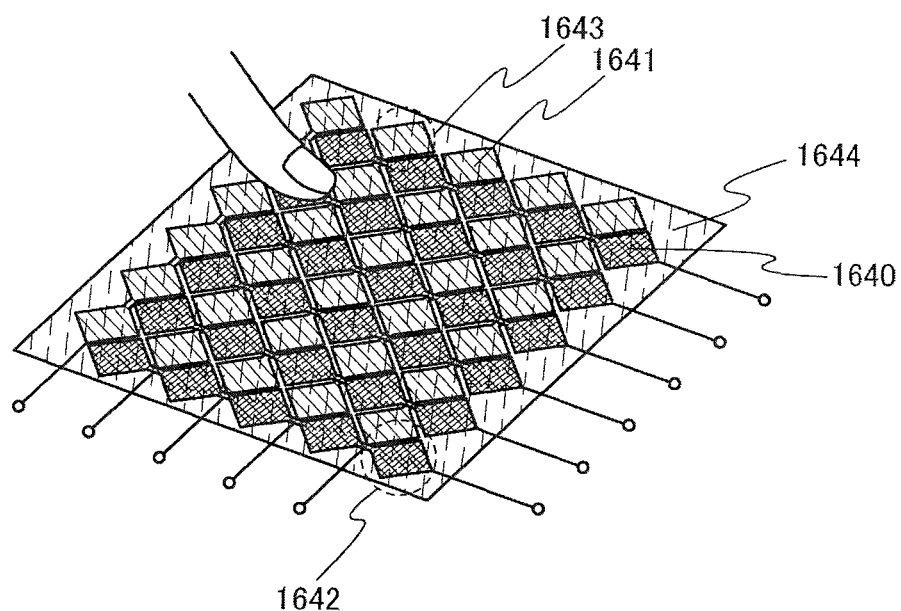

Further, in FIG. 12A, an insulating layer 1644 functioning as a dielectric is provided over and overlaps with the plurality of the first electrodes 1640 and the plurality of the second electrodes 1641. In FIG. 12B, the plurality of the first electrodes 1640, the plurality of the second electrodes 1641, and the insulating layer 1644 which are illustrated in FIG. 12A overlap with one another. As illustrated in FIG. 12B, the plurality of the first electrodes 1640 and the plurality of the second electrodes 1641 overlap with each other so that the rectangular conductive films 1642 and the rectangular conductive films 1643 are different from each other in position.

When the finger or the like touches the insulating layer 1644, a capacitor is formed between any of the plurality of the first electrodes 1640 and the finger, for example. In addition, a capacitor is formed between any of the plurality of the second electrodes 1631 and the finger. Accordingly, when a change of electrostatic capacity is monitored, it is possible to specify the first electrode 1630 and the second electrode 1631 which come the closest to the finger; therefore, the position where the finger touches can be detected.

Note that the touch panel included in the semiconductor display device according to one embodiment of the present invention may have a structure in which the positional information indicated by the user in the position detection portion can be taken out as a signal, and structures other than the structures illustrated in FIG. 11 and FIGS. 12A and 12B can be used.

In addition, the liquid crystal display device according to one embodiment of the present invention may include a photosensor in the pixel portion, instead of the touch panel. An example of a structure of a pixel portion including a photosensor is schematically illustrated in FIG. 17A.

Figure 17A:
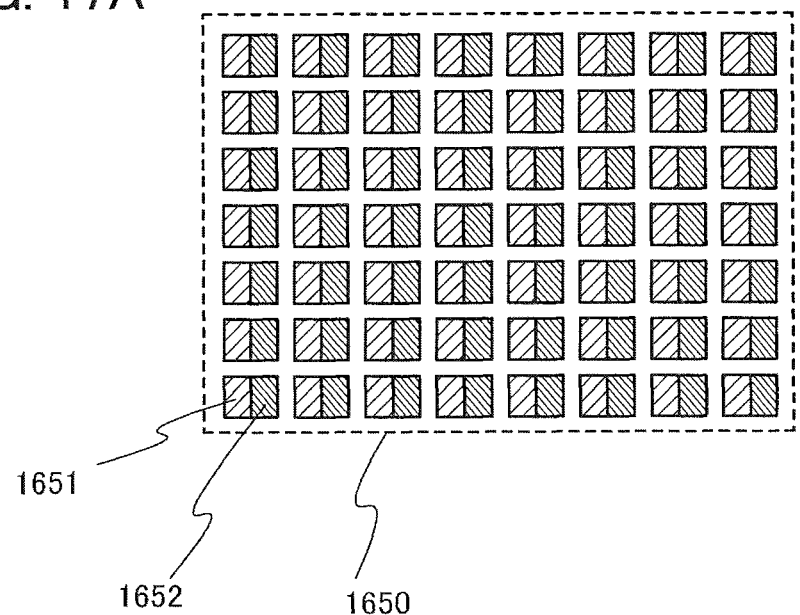
FIGS. 17A and 17B each illustrate a structure of a pixel portion including a photosensor.

A pixel portion 1650 illustrated in FIG. 17A includes a pixel 1651 and a photosensor 1652 corresponding to the pixel 1651. The photosensor 1652 includes a transistor and a light-receiving element which has a function of generating an electrical signal when receiving light, such as a photodiode. Note that as light which is received by the photosensor 1652, reflected light obtained when light from a backlight is shone on an object can be used.

Figure 17B:
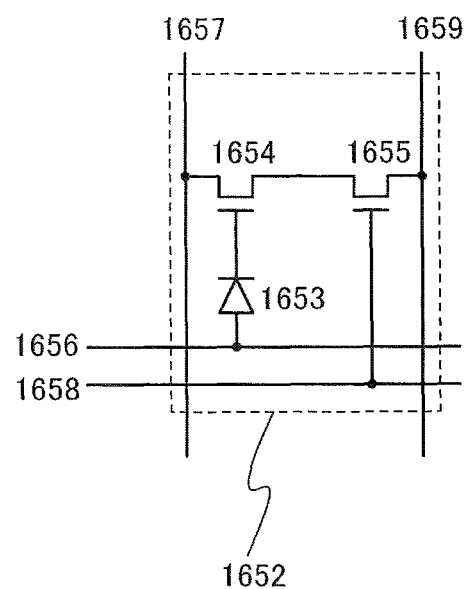

A structure of the photosensor 1652 is illustrated in FIG. 17B. The photosensor 1652 illustrated in FIG. 17B includes a photodiode 1653, a transistor 1654, and a transistor 1655. One electrode of the photodiode 1653 is connected to a reset signal line 1656, and the other electrode of the photodiode 1653 is connected to a gate electrode of the transistor 1654. One of a source electrode and a drain electrode of the transistor 1654 is connected to a reference signal line 1657, and the other thereof is connected to one of a source electrode and a drain electrode of the transistor 1655. A gate electrode of the transistor 1655 is connected to a gate signal line 1658, and the other of the source electrode and the drain electrode of the transistor 1655 is connected to an output signal line 1659.

Note that a circuit configuration of the photosensor 1652 is not limited to the above-described structure, and may be a circuit configuration in which information on light intensity can be taken out as an electrical signal may be used. In addition, amorphous silicon, microcrystalline silicon, polycrystalline silicon, or single crystal silicon can be used for the photodiode 1653.

This embodiment can be implemented in combination with any of the other embodiments, as appropriate.

(Embodiment 9)

In a liquid crystal display device according to one embodiment of the present invention, a highly reliable transistor with low off-state current is used in a pixel portion; therefore, high visibility and high reliability can be obtained.

Figure 13:
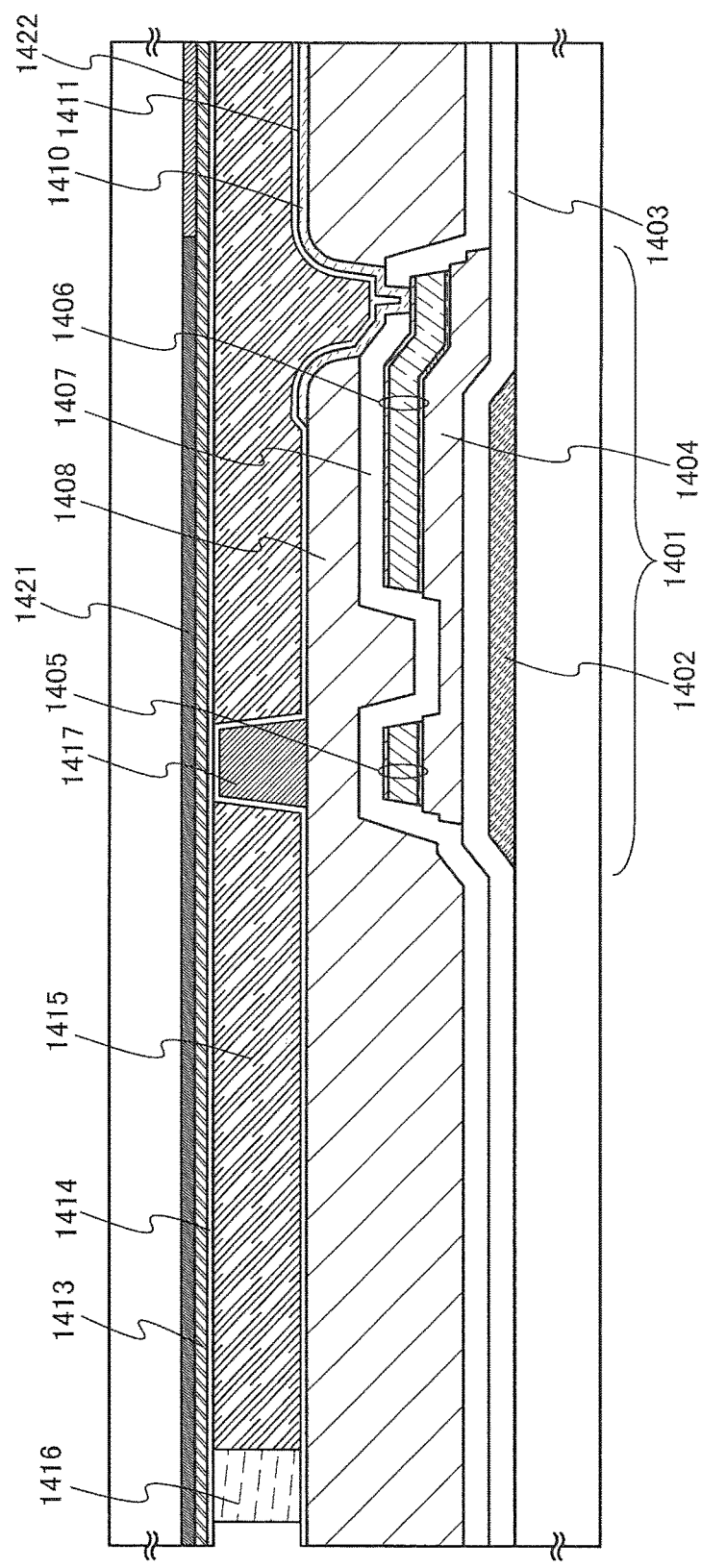
FIG. 13 is a cross-sectional view of a pixel.

FIG. 13 illustrates a cross-sectional view of a pixel in a liquid crystal display device according to one embodiment of the present invention. A transistor 1401 illustrated in FIG. 13 includes a gate electrode 1402 formed over an insulating surface, a gate insulating film 1403 over the gate electrode 1402, an oxide semiconductor film 1404 which is over the gate insulating film 1403 and which overlaps with the gate electrode 1402, and a conductive film 1405 and a conductive film 1406 which function as a source electrode and a drain electrode and which are formed over the oxide semiconductor film 1404. Further, the transistor 1401 may include an insulating film 1407 formed over the oxide semiconductor film 1404 as a component. The insulating film 1407 is formed so as to cover the gate electrode 1402, the gate insulating film 1403, the oxide semiconductor film 1404, the conductive film 1405, and the conductive film 1406.

An insulating film 1408 is formed over the insulating film 1407. An opening is provided in part of the insulating film 1407 and part of the insulating film 1408, and a pixel electrode 1410 is formed so as to be in contact with the conductive film 1406 in the opening.

Further, a spacer 1417 for controlling a cell gap of a liquid crystal element is formed over the insulating film 1408. An insulating film is etched to have a desired shape, so that the spacer 1417 can be formed. A cell gap may also be controlled by dispersing a spherical spacer over the insulating film 1408.

An alignment film 1411 is formed over the pixel electrode 1410. Further, a counter electrode 1413 is provided in a position opposed to the pixel electrode 1410, and an alignment film 1414 is formed on the side of the counter electrode 1413 which is close to the pixel electrode 1410. The alignment film 1411 and the alignment film 1414 can be formed using an organic resin such as polyimide or polyvinyl alcohol. Alignment treatment such as rubbing is performed on their surfaces in order to align liquid crystal molecules in certain direction. Rubbing can be performed by rolling a roller wrapped with cloth of nylon or the like while being in contact with the alignment films and the surfaces of the alignment films are rubbed in a certain direction. Note that it is also possible to directly form the alignment films 1411 and 1414 that have alignment characteristics by using an inorganic material such as silicon oxide by an evaporation method, without alignment treatment.

Furthermore, a liquid crystal 1415 is provided in a region which is surrounded by a sealant 1416 between the pixel electrode 1410 and the counter electrode 1413. Injection of the liquid crystal 1415 may be performed with a dispenser method (dripping method) or a dipping method (pumping method). Note that a filler may be mixed in the sealant 1416.

In FIG. 13, a light-blocking film 1421 which can block light is formed between the pixels so that disclination due to variations between the pixels in the alignment of the liquid crystal 1415 is prevented from seeing. The light-blocking film can be formed using an organic resin containing a black pigment such as a carbon black or titanium lower oxide. Alternatively, a film of chromium can be used for the light-blocking film.

Then, a coloring layer 1422 functioning as a color filter, through which only visible light in a particular wavelength region is preferentially transmitted is provided in a position where the pixel electrode 1410, the counter electrode 1413, and the liquid crystal 1415 overlap with each other. When the coloring layer 1422 through which light in a wavelength region corresponding to red, blue, and green is preferentially transmitted is provided in each pixel, a full color image can be displayed. In this case, it is preferable to use a backlight by which white light can be obtained so that color purity of an image is increased. As the backlight by which white light can be obtained, for example, a structure in which a red light source, a blue light source, and a green light source are combined; a structure in which a yellow or orange light source and a blue light source are combined; a structure in which only a white light source is used; a structure in which a cyan light source, a magenta light source, and a yellow light source are combined; or the like can be employed.

Alternatively, light in a wavelength region corresponding to red, blue, and green may be output sequentially from the backlight. In this case, a full color image can be displayed even when a color filter is not used, and luminous efficiency of the semiconductor display device can be increased. However, when a display state of a display element is fixed at the time of displaying a still image, a single color image instead of a full color image can be obtained in the case where the color filter is not used, whereas a full color image can be obtained in the case where the color filter is used.

In addition to a cold-cathode tube, a light-emitting element such as an LED or an OLED can be used as a light source. Note that because a wavelength of light to be obtained is different depending on a light source, a light source may be selected as appropriate in accordance with a required color.

Note that in FIG. 13, the case where the light-blocking film 1421 and the coloring layer 1422 are provided on the counter electrode 1413 side is illustrated; however, the light-blocking film 1421 or the coloring layer 1422 may be provided on the pixel electrode 1410 side. The positions of the light-blocking film 1421 and the coloring layer 1422 can be set as appropriate in accordance with a direction of light incident on the liquid crystal 1415 and an emission direction of light transmitted through the liquid crystal 1415.

The pixel electrode 1410 and the counter electrode 1413 can be formed using a transparent conductive material such as indium tin oxide including silicon oxide (ITSO), indium tin oxide (ITO), zinc oxide (ZnO), indium zinc oxide (IZO), or gallium-doped zinc oxide (GZO), for example.

Although a liquid crystal display device of a TN (twisted nematic) mode is described in this embodiment, another liquid crystal display device of a VA (vertical alignment) mode, an OCB (optically compensated birefringence) mode, an IPS (in-plane-switching) mode, an MVA (multi-domain vertical alignment) mode, or the like may be used.

Alternatively, liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase is generated within an only narrow range of temperature, liquid crystal composition containing a chiral agent at 5wt % or more so as to improve the temperature range is used for the liquid crystal 1415. The liquid crystal composition including liquid crystal exhibiting a blue phase and a chiral agent has a short response time of greater than or equal to 10 μsec and less than or equal to 100 μsec and is optically isotropic; therefore, alignment treatment is not necessary and viewing angle dependence is small.

Note that although the liquid crystal element in which the liquid crystal 1415 is interposed between a pixel electrode 1409 and the counter electrode 1413 is described as an example in FIG. 13, the liquid crystal display device according to one embodiment of the present invention is not limited to this structure. A liquid crystal element in which a pair of electrodes is provided on one substrate as an IPS type liquid crystal element or a liquid crystal element using the blue phase may also be employed.

Figure 14A:
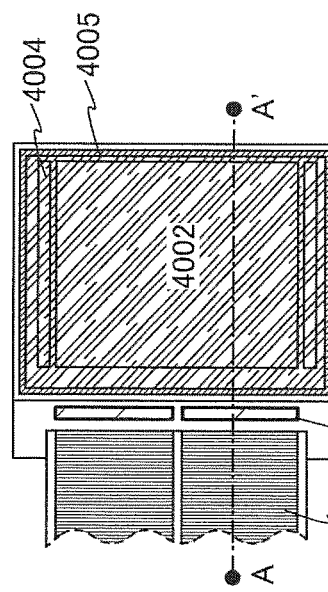
FIGS. 14A and 14B each illustrate a structure of a panel.
Figure 14B:
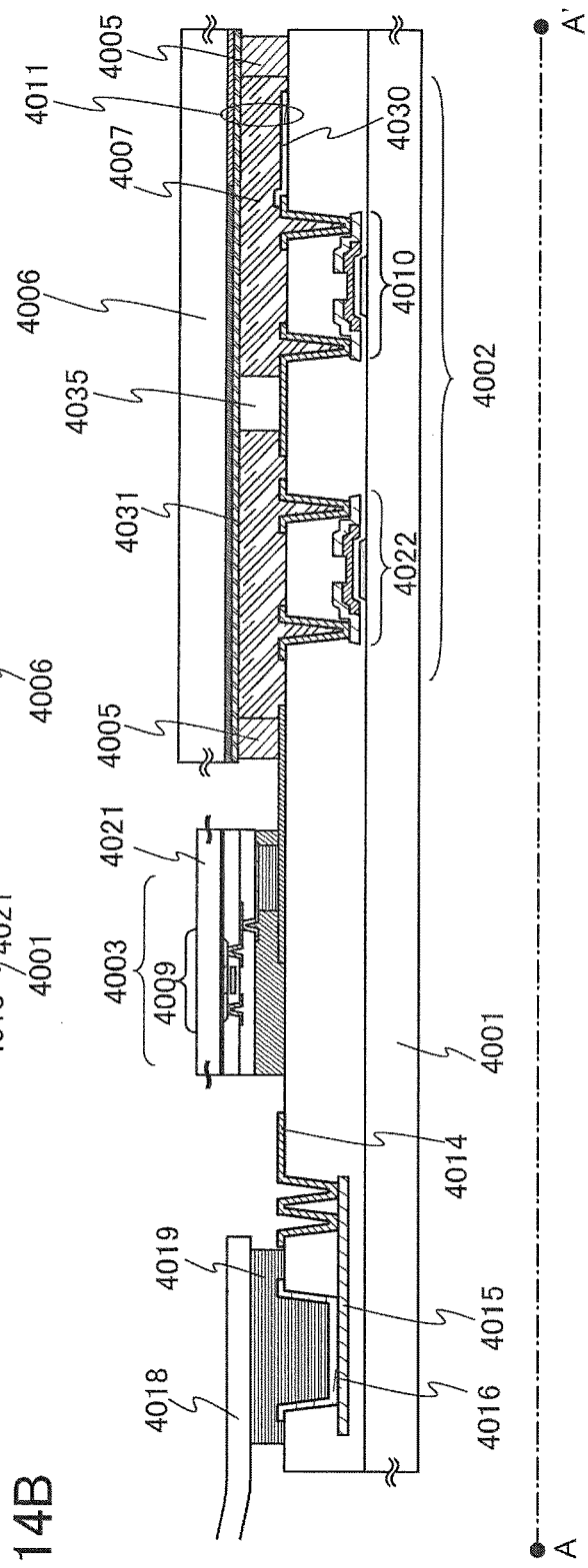

Next, the appearance of a panel of a liquid crystal display panel according to one embodiment of the present invention will be described with reference to FIGS. 14A and 14B. FIG. 14A is a top view of a panel in which a substrate 4001 and a counter substrate 4006 are attached to each other with a sealant 4005, and FIG. 14B is a cross-sectional view taken along A-A' of FIG. 14A.

The sealant 4005 is provided so as to surround a pixel portion 4002 and a scan line driver circuit 4004 which are provided over the substrate 4001. The counter substrate 4006 is provided over the pixel portion 4002 and the scan line driver circuit 4004. Accordingly, the pixel portion 4002 and the scan line driver circuit 4004 are sealed together with a liquid crystal 4007, by the substrate 4001, the sealant 4005, and the counter substrate 4006.

In addition, a substrate 4021 where a signal line driver circuit 4003 is formed is mounted on the substrate 4001 in a region other than the region surrounded by the sealant 4005. FIG. 14B illustrates a transistor 4009 in the signal line driver circuit 4003.

A plurality of transistors is included in the pixel portion 4002 and the scan line driver circuit 4004, which are formed over the substrate 4001. FIG. 14B illustrates a transistor 4010 and a transistor 4022 which are included in the pixel portion 4002. Each of the transistor 4010 and the transistor 4022 includes an oxide semiconductor in a channel formation region.

A pixel electrode 4030 included in a liquid crystal element 4011 is electrically connected to the transistor 4010. A counter electrode 4031 of the liquid crystal element 4011 is formed on the counter substrate 4006. A portion where the pixel electrode 4030, the counter electrode 4031, and the liquid crystal 4007 overlap with each other corresponds to the liquid crystal element 4011.

A spacer 4035 is provided in order to control the distance (a cell gap) between the pixel electrode 4030 and the counter electrode 4031. Note that FIG. 14B illustrates the case where the spacer 4035 is formed by patterning an insulating film; however, a spherical spacer may be used.

Image signals, driving signals, and power supply potentials which are applied to the signal line driver circuit 4003, the scan line driver circuit 4004, and the pixel portion 4002 are supplied from a connection terminal 4016 through lead wirings 4014 and 4015. The connection terminal 4016 is electrically connected to a terminal of an FPC 4018 through an anisotropic conductive film 4019.

Figure 15:
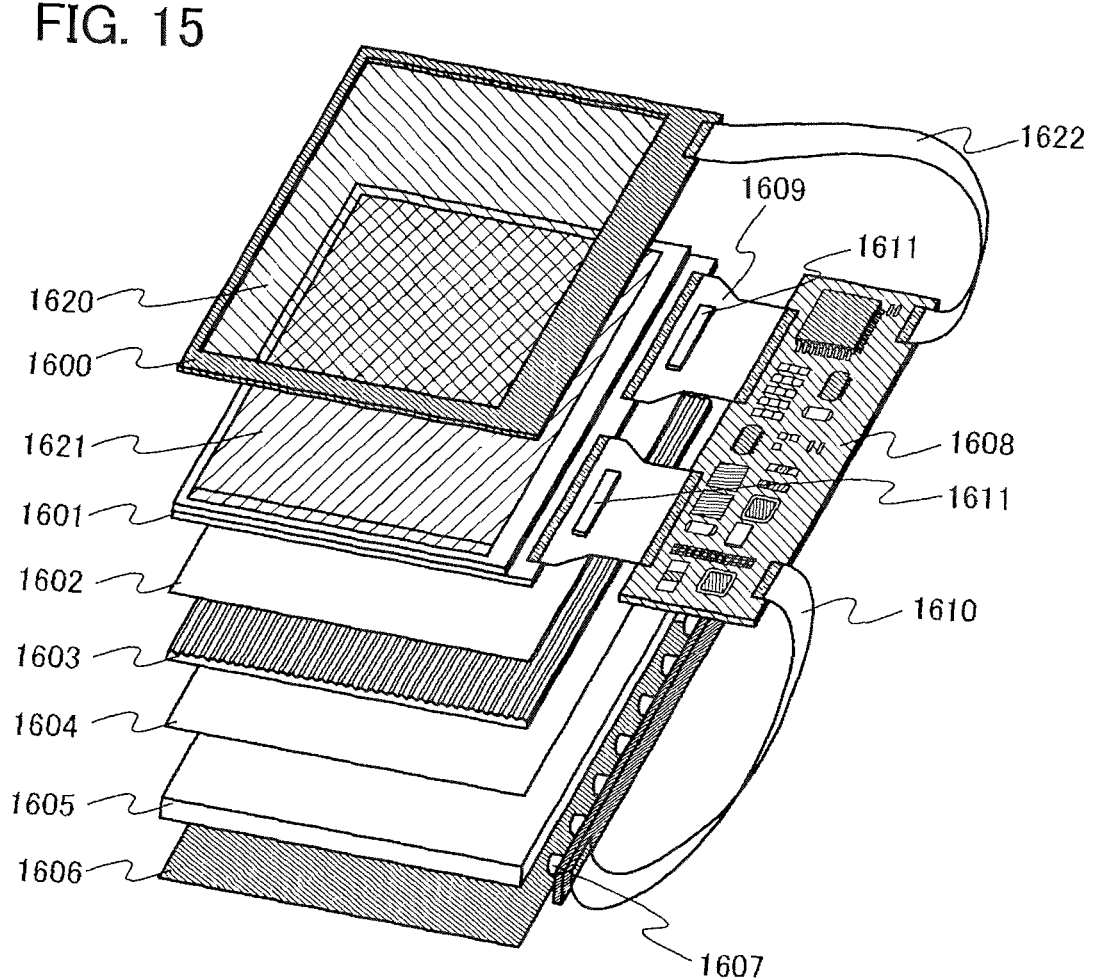
FIG. 15 is a perspective view of a structure of a semiconductor display device.

Next, FIG. 15 illustrates an example of a perspective view illustrating a structure of the liquid crystal display device according to one embodiment of the present invention. The liquid crystal display device illustrated in FIG. 15 includes a touch panel 1600, a panel 1601, a first diffuser plate 1602, a prism sheet 1603, a second diffuser plate 1604, a light guide plate 1605, a reflective plate 1606, a backlight 1607, a circuit board 1608, and a substrate 1611 provided with a signal line driver circuit.

The touch panel 1600, the panel 1601, the first diffuser plate 1602, the prism sheet 1603, the second diffuser plate 1604, the light guide plate 1605, and the reflective plate 1606 are sequentially stacked. The backlight 1607 is provided at an end portion of the light guide plate 1605. Light from the backlight 1607 diffused into the light guide plate 1605 is uniformly delivered to the panel 1601 with the help of the first diffuser plate 1602, the prism sheet 1603, and the second diffuser plate 1604.

The touch panel 1600 includes a position detection portion 1620. The position detection portion 1620 is arranged so as to overlap with a pixel portion 1621 included in the panel 1601. When a finger, a stylus, or the like touches or gets close to the position detection portion 1620, a signal including the positional information is generated.

Note that in the semiconductor display device illustrated in FIG. 15, the touch panel 1600 is arranged between the panel 1601 and the user. In this case, when the position detection portion 1620 of the touch panel 1600 has light-transmitting properties, the user can see an image in the pixel portion 1621 through the position detection portion 1620. Note that the touch panel 1600 is not necessarily provided between the panel 1601 and the user. For example, in the case where the touch panel 1600 is of electromagnetic induction system, the panel 1601 may be provided between the user and the touch panel 1600.

Although the first diffuser plate 1602 and the second diffuser plate 1604 are used in this embodiment, the number of diffuser plates is not limited thereto. The number of diffuser plates may be one, or may be three or more. The diffuser plate may be provided between the light guide plate 1605 and the panel 1601. Therefore, the diffuser plate may be provided only on the side closer to the panel 1601 than the prism sheet 1603, or may be provided only on the side closer to the light guide plate 1605 than the prism sheet 1603.

Moreover, the shape of the cross section of the prism sheet 1603 is not limited to a sawtooth shape as illustrated in FIG. 15, and may be a shape capable of collecting light from the light guide plate 1605 over the panel 1601.

The circuit board 1608 is provided with a control circuit for the touch panel, a CPU, a display control circuit, a control circuit which controls driving of the backlight 1607, and the like. In FIG. 15, the circuit board 1608 and the panel 1601 are connected to each other via a COF tape 1609. In addition, the substrate 1611 provided with the signal line driver circuit is connected to the COF tape 1609 by a chip on film (COF) method. In addition, the circuit board 1608 and the touch panel 1600 are connected to each other via an FPC 1622.

In FIG. 15, an example is illustrated in which the control circuit which controls driving of the backlight 1607 and the backlight 1607 are connected to each other via an FPC 1610. However, the above control circuit may be formed in the panel 1601; in this case, the panel 1601 and the backlight 1607 are connected to each other via an FPC or the like.

Note that although FIG. 15 illustrates an edge-light type backlight where the backlight 1607 is provided on the edge of the panel 1601, the liquid crystal display device of the present invention may be a direct-below type in which the backlight 1607 is provided directly below the panel 1601.

This embodiment can be implemented in combination with any of the other embodiments, as appropriate.

EXAMPLE 1

By using a semiconductor display device according to one embodiment of the present invention, an electronic device with low power consumption can be provided. In particular, in the case of a portable electronic device to which electric power cannot be easily supplied, continuous use time becomes longer by adding the semiconductor display device according to one embodiment of the present invention as a component, which is an advantage.

The semiconductor display device according to one embodiment of the present invention can be used for display devices, laptop personal computers, or image reproducing devices provided with recording media (typically, devices which reproduce the content of recording media such as digital versatile discs (DVDs) and have displays for displaying the reproduced images). Further, the electronic devices in which the semiconductor display device according to one embodiment of the present invention can be used is the following: mobile phones, portable game machines, portable information terminals, e-book readers, video cameras, digital still cameras, goggle-type displays (head mounted displays), navigation systems, audio reproducing devices (for example, car audio systems or digital audio players), copying machines, facsimile machines, printers, versatile printers, automated teller machines (ATMs), vending machines, or the like. Specific examples of these electronic devices are illustrated in FIGS. 16A to 16F.

Figure 16A:
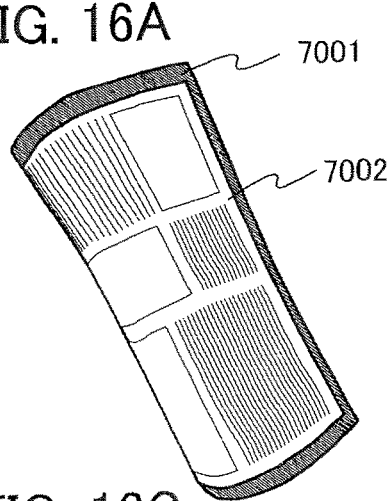
FIGS. 16A to 16F each illustrate an electronic device.

FIG. 16A illustrates an e-book reader including a housing 7001, a display portion 7002, and the like. The semiconductor display device according to one embodiment of the present invention can be used for the display portion 7002. By using the semiconductor display device according to one embodiment of the present invention for the display portion 7002, an e-book reader with low power consumption can be provided. Moreover, when a panel is formed with the use of a flexible substrate and a touch panel has flexibility, the semiconductor display device can have flexibility. Thus, a flexible, lightweight, and easy-to-use e-book reader can be provided.

Figure 16B:
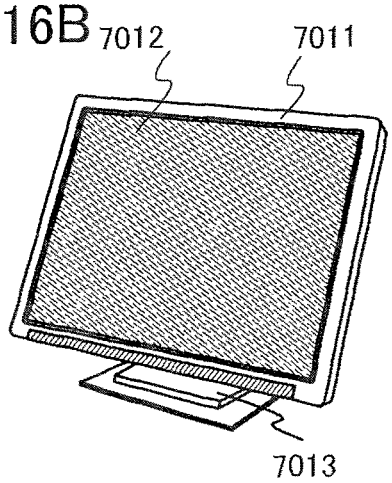

FIG. 16B illustrates a display device including a housing 7011, a display portion 7012, a supporting base 7013, and the like. The semiconductor display device according to one embodiment of the present invention can be used for the display portion 7012. By using the semiconductor display device according to one embodiment of the present invention for the display portion 7012, a display device with low power consumption can be provided. Note that a display device includes all display devices for displaying information, such as display devices for personal computers, for receiving television broadcast, and for displaying advertisement, in its category.

Figure 16C:
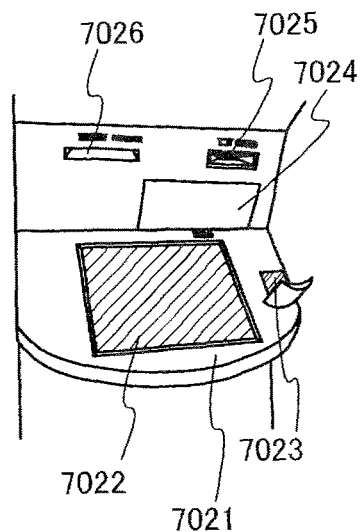

FIG. 16C illustrates an automated teller machine including a housing 7021, a display portion 7022, a coin slot 7023, a bill slot 7024, a card slot 7025, a bankbook slot 7026, and the like. The semiconductor display device according to one embodiment of the present invention can be used for the display portion 7022. By using the semiconductor display device according to one embodiment of the present invention for the display portion 7022, an automated teller machine with low power consumption can be provided.

Figure 16D:
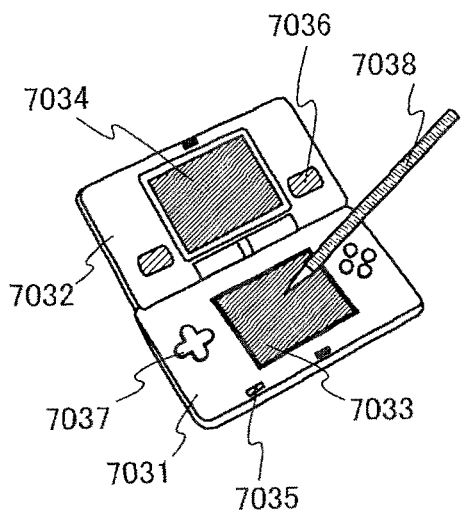

FIG. 16D illustrates a portable game machine including a housing 7031, a housing 7032, a display portion 7033, a display portion 7034, a microphone 7035, speakers 7036, an operation key 7037, a stylus 7038, and the like. The semiconductor display device according to one embodiment of the present invention can be used for the display portion 7033 and the display portion 7034. By using the semiconductor display device according to one embodiment of the present invention for the display portion 7033 and the display portion 7034, a portable game machine with low power consumption can be provided. Note that the portable game machine illustrated in FIG. 16D has the two display portions 7033 and 7034. However, the number of display portions included in a portable game machine is not limited thereto.

Figure 16E:
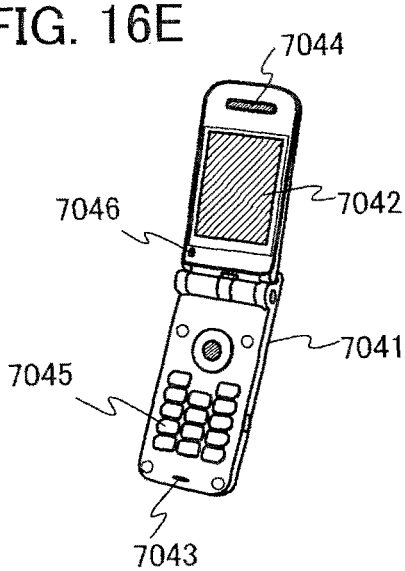

FIG. 16E illustrates a mobile phone including a housing 7041, a display portion 7042, an audio-input portion 7043, an audio-output portion 7044, operation keys 7045, a light-receiving portion 7046, and the like. Light received in the light-receiving portion 7046 is converted into electrical signals, whereby external images can be loaded. The semiconductor display device according to one embodiment of the present invention can be used for the display portion 7042. By using the semiconductor display device according to one embodiment of the present invention for the display portion 7042, a mobile phone with low power consumption can be provided.

Figure 16F:
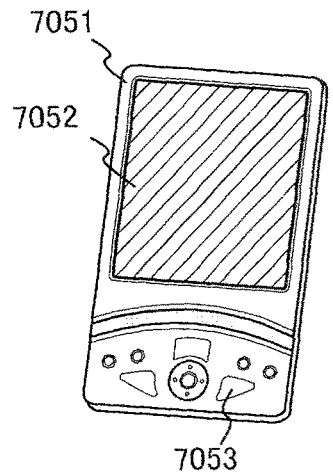

FIG. 16F is a portable information terminal including a housing 7051, a display portion 7052, an operation key 7053, and the like. In the portable information terminal illustrated in FIG. 16F, a modem may be incorporated in the housing 7051. The semiconductor display device according to one embodiment of the present invention can be used for the display portion 7052. By using the semiconductor display device according to one embodiment of the present invention for the display portion 7052, a portable information terminal with low power consumption can be provided.

This example can be implemented in combination with any of the above-described embodiments, as appropriate.

This application is based on Japanese Patent Application serial no. 2010-102891 filed with the Japan Patent Office on Apr. 28, 2010, the entire contents of which are hereby incorporated by reference.

The invention claimed is:

1. A display device comprising:
   a pixel portion comprising:
      a transistor, a channel formation region of the transistor comprising an oxide semiconductor; and
      a display element electrically connected to the transistor;
   a driver circuit configured to drive the pixel portion; and
   a touch panel overlapping with the pixel portion,
   wherein a driving frequency of the driver circuit is changed in accordance with an operation signal supplied from the touch panel, and
   wherein supply of a power supply potential, a clock signal, and a start signal to the driver circuit is stopped when a still image is displayed in the pixel portion.

2. The display device according to claim 1, further comprising:
   a display control circuit electrically connected to the pixel portion and the driver circuit; and
   a CPU electrically connected to the touch panel and the display control circuit.

3. The display device according to claim 1, wherein an off-state current density of the transistor is less than or equal to 100 zA/µm.

4. The display device according to claim 1, wherein a length of displaying the still image in the pixel portion is changed in accordance with the operation signal supplied from the touch panel.

5. The display device according to claim 1, wherein the driving frequency of the driver circuit when the still image is displayed in the pixel portion is lower than the driving frequency of the driver circuit when a moving image is displayed in the pixel portion.

6. The display device according to claim 1, wherein the driver circuit is configured to input an image signal to the pixel portion in a first period when the power supply potential, the clock signal, and the start signal are supplied to the driver circuit, and is configured to stop an input of the image signal to the pixel portion in a second period when supply of the power supply potential, the clock signal, and the start signal to the driver circuit is stopped.

7. The display device according to claim 1, wherein the touch panel uses any one of a resistive system, a touch panel capacitance system, an ultrasonic system, an optics system, and an electromagnetic induction system.

8. The display device according to claim 1, wherein the touch panel comprises a plurality of first electrodes and a plurality of second electrodes overlapping with the plurality of first electrodes.

9. A display device comprising:
   a pixel portion comprising:
      a transistor, a channel formation region of the transistor comprising an oxide semiconductor;
      a display element electrically connected to the transistor; and
      a photosensor; and
   a driver circuit configured to drive the pixel portion,
   wherein a driving frequency of the driver circuit is changed in accordance with an operation signal supplied from the photosensor, and
   wherein supply of a power supply potential, a clock signal, and a start signal to the driver circuit is stopped when a still image is displayed in the pixel portion.

10. The display device according to claim 9, further comprising:
    a display control circuit electrically connected to the pixel portion and the driver circuit; and
    a CPU electrically connected to the display control circuit.

11. The display device according to claim 9, wherein an off-state current density of the transistor is less than or equal to 100 zA/μm.

12. The display device according to claim 9, wherein a length of displaying the still image in the pixel portion is changed in accordance with the operation signal supplied from the photosensor.

13. The display device according to claim 9, wherein the driving frequency of the driver circuit when the still image is displayed in the pixel portion is lower than the driving frequency of the driver circuit when a moving image is displayed in the pixel portion.

14. The display device according to claim 9, wherein the driver circuit is configured to input an image signal to the pixel portion in a first period when the power supply potential, the clock signal, and the start signal are supplied to the driver circuit, and is configured to stop an input of the image signal to the pixel portion in a second period when supply of the power supply potential, the clock signal, and the start signal to the driver circuit is stopped.

15. The display device according to claim 9, wherein the photosensor comprises a photodiode.

* * * * *